United States Patent [19]
Jones et al.

[11] Patent Number: 5,812,844
[45] Date of Patent: Sep. 22, 1998

[54] METHOD AND SYSTEM FOR SCHEDULING THE EXECUTION OF THREADS USING OPTIONAL TIME-SPECIFIC SCHEDULING CONSTRAINTS

[75] Inventors: Michael B. Jones, Redmond; Paul J. Leach; Richard P. Draves, Jr., both of Seattle, all of Wash.; Joseph S. Barrera, III, Belmont, Calif.; Steven P. Levi, Redmond, Wash.; Richard F. Rashid, Woodinville, Wash.; Robert P. Fitzgerald, Redmond, Wash.

[73] Assignee: Microsoft Corporation, Redmond, Wash.

[21] Appl. No.: 568,577

[22] Filed: Dec. 7, 1995

[51] Int. Cl.⁶ ........................................ G06F 9/00
[52] U.S. Cl. .................. 395/674; 395/672; 395/670
[58] Field of Search .................... 395/650, 672, 395/673, 720, 677

[56] References Cited

U.S. PATENT DOCUMENTS 5,586,318 12/1996 Toutonghi .............................. 395/677

OTHER PUBLICATIONS

"Priority Inversion in Real–time Communication", Hideyuki Tokuda, et al. School of C. S. Dep. of Elec & Comp Eng. Carnegie Mellon University, 1989 IEEE.

Anderson, David P., "Metascheduling for Continuous Media," *ACM Transactions on Computer Systems*, vol. 11, No. 3, pp. 226–252, 1993.

Locke, Douglass C., "Best–Effort Decision Making for Real–Time Scheduling," *Department of Computer Science, Carnegie Mellon University*, pp. 1–144, 1986.

Northcutt, Duane J. et al., "Decentralized Real–Time Scheduling," *RADC–TR–90–182 Final Technical Report—Rome Air Development Center—Carnegie Mellon University*, pp. A–1, A–3 through A–35, B–1 through B–24, C–1 through C–15, C–17 through C–37, C–41 through C–115, C–117 through C–141, C–143 through C–149, C–151 through C–163, 1990.

Northcutt, Duane J., "Mechanism for Reliable Distributed Real–Time Operating Systems—The Alpha Kernal," *Academic Press, Inc.*, vol. 16, pp. 1–29, 31–171, 173–217, 219–235, 1987.

*Primary Examiner*—Majid A. Banankhah
*Attorney, Agent, or Firm*—Seed and Berry LLP

[57] ABSTRACT

A method and system for scheduling the execution of threads using optional time-specific constraints is provided. In a preferred embodiment, a scheduler schedules the execution of a plurality of threads each specifying either a percentage processor time scheduling constraint, indicating that a certain percentage of processor time should be dedicated to the execution of the thread, or a deadline scheduling constraint, indicating that a specified quantity of work should be done by the thread by a specified time deadline. For each thread specifying a percentage processor time scheduling constraint, the scheduler determines a restart time corresponding to the percentage processor time scheduling constraint. For each thread specifying a deadline scheduling constraint, the scheduler determines a restart time corresponding to the deadline scheduling constraint. The scheduler then utilizes the determined restart times for scheduling the threads by selecting the thread having the earliest restart time for execution.

22 Claims, 33 Drawing Sheets

METHOD AND SYSTEM FOR SCHEDULING THE EXECUTION OF THREADS USING OPTIONAL TIME-SPECIFIC SCHEDULING CONSTRAINTS

CROSS-REFERENCE TO RELATED APPLICATIONS

The following applications, filed concurrently herewith, contain related subject matter: U.S. patent application Ser. No. 08/569,048, "METHOD AND SYSTEM FOR SCHEDULING THE USE OF ONE OR MORE COMPUTER SYSTEM RESOURCE USING A RESOURCE PLANNER AND A RESOURCE PROVIDER," and U.S. patent application Ser. No. 08/568,578, "METHOD AND SYSTEM FOR RESOURCE MANAGEMENT WITH INDEPENDENT REAL-TIME APPLICATIONS ON A COMMON SET OF MACHINES."

TECHNICAL FIELD

The invention relates generally to the field of computer multitasking, and, more specifically, to the field of thread scheduling.

BACKGROUND OF THE INVENTION

Multitasking operating systems allow a number of different programs to execute "simultaneously" on a single processor. Multiprocessor multitasking operating systems, designed for computer systems having more than one processor, further permit the "simultaneous" execution of a number of programs larger than the number of processors. Such multitasking operating systems do so by rapidly switching each processor between the execution of multiple programs.

A single program may have one or more threads. The word "thread" as used herein means the finest scheduleable unit of execution. A thread is typically represented by a data structure called an execution context, which contains state information about the execution of the thread, such as register and stack contents. When the operating system suspends a thread in favor of the execution of another thread, it copies the information from the registers and stack to the thread's execution context. When the operating system subsequently reselects the thread for execution after suspending another thread, it copies the information in the thread's execution context back to the actual registers and stack. In this way, the thread continues executing with the same register and stack contents as when it was suspended. One or more threads often belong to a process, which corresponds to a body of code and which may own certain single-process resources, such as blocks of memory. While processes and programs can be viewed as roughly equivalent, in some cases, multiple processes may be said to constitute a program, and, in other cases, a process may include several programs.

The process of determining which threads to execute at which times is generally termed "scheduling" a computer system's CPU. A typical conventional scheduling strategy is to divide the processor time resource into "time slices" having a uniform length. At the expiration of a time slice, a conventional scheduler identifies a thread to execute during the next time slice. In a balanced allocation scheme, each ready thread receives one time slice in turn, so that the processor time is divided evenly among the ready threads. In a weighted allocation scheme, each thread specifies the percentage of total processor time it is to receive. The scheduler then uses an accounting process to keep track of the number of time slices each thread has received, and assigns the next time slice to the thread that is furthest from having received its specified percentage. Such time slice scheduling has two significant disadvantages. First, such time slice scheduling can be inefficient because it involves frequent reassignments of the processor. On the other hand, even the weighted allocation scheme does not take into account thread processor requirements finer than the overall percentage of processor time that must be used to successfully schedule multiple threads having significant processor time demands.

The way in which scheduling is performed can significantly impact a user's perception of whether individual threads are performing adequately. Modem multimedia applications, for example, often require substantial processor time, and appear to proceed slowly or jerkily if they do not receive it. To ensure adequate performance, conventional multimedia applications and other real-time applications typically secure exclusive use of the processor, to the exclusion of any other existing threads.

It is common for threads to request a service of some hardware device connected to the computer system. Such hardware device connected to a computer system typically interacts with the computer system by raising an assigned one of a set of device interrupts. The computer system typically responds to the interrupt by executing an interrupt handling routine corresponding to the raised interrupt. In conventional operating systems, this device interrupt handling is typically performed preemptively by, when a device interrupt occurs, suspending the normal scheduled processing of threads while executing the interrupt processing routine. As a result, time-critical threads can be suspended for significant periods of time when their execution coincides with device interrupts.

SUMMARY OF THE INVENTION

The present invention provides a method and system for scheduling the execution of threads using optional time-specific scheduling constraints. In a preferred embodiment, a thread scheduling software facility ("the scheduler") uses a unified urgency indicator to schedule the execution of each of a plurality of threads producing predictable performance in which the threads are scheduled to execute when needed. The scheduler maintains an urgency indicator for each thread based either on a time-specific scheduling constraint that specifies an absolute deadline for a specified quantity of work or on a time-general scheduling constraint that specifies a percentage of processor time to be dedicated to the thread, depending on which type of scheduling constraint is specified for the thread. Modem multimedia applications demand time-specific scheduling for acceptable performance, and their threads are examples of threads for which time-specific scheduling constraints are specified. Modern applications generally also specify time-general scheduling constraints for their threads, which specify the percentage of processor time to be dedicated to the execution of the thread in the long term. Many older legacy programs, on the other hand, specify only time-general scheduling constraints for their threads. If no scheduling constraints are specified for a thread, the facility, or another entity such as the operating system, preferably specifies a default time-general scheduling constraint so that the scheduler permits the thread to execute. The threads scheduled by the scheduler preferably include threads for performing device interrupt handling, so that device interrupt handling is scheduled against the tasks performed by other executing programs.

The indications of urgency used by the scheduler to prioritize the execution of threads are time-sensitive, and reflect the importance of executing a thread at a particular time rather than solely the overall importance of a thread. The scheduler preferably utilizes "restart times" as such indications of urgency. Restart times represent urgency in a time-sensitive way by measuring the time at which a thread needs to begin exclusive execution in order to satisfy a deadline specified for the thread. Given the likelihood that a particular thread will not be allowed to execute exclusively, a thread generally must begin execution substantially before its restart time in order to successfully complete its scheduling constraints. Restart times, however, do reflect the relative priority, or time-sensitive urgency, of a number of threads—the thread with the earliest restart time is the most urgent thread, the thread with the second earliest restart time is the second most urgent thread, etc. The scheduler's use of restart times as indications of urgency is consistent with a minimum laxity first approach, in which threads with the minimum scheduling flexibility are scheduled first. The indications of urgency used by the scheduler preferably also include an indication of criticality. If a thread is critical, it is more urgent than all non-critical threads. If two threads are both critical, the thread with the earlier restart time is more urgent. Criticality is generally used by threads to identify situations in which the degradation of their performance would be unacceptable.

Instead of allocating processor time in fixed-length time slices, the scheduler preferably utilizes custom timer interrupts to assign the processor to a thread for a period of time tailored to reduce the urgency of that thread to slightly below the urgency of the next most urgent thread. This aspect of the invention minimizes the processor time spent scheduling the processor, or "scheduling latency," as the facility may efficiently allocate the processor to a thread for the appropriate amount of time without having to interrupt the thread to reevaluate the schedule.

The scheduler further supports the inheritance of urgency from threads for which a service is being performed (client threads) by threads that are performing that service (server threads). Server threads can include those threads invoked by local and network remote procedure calls and those threads utilized to process device interrupts. Such inheritance may be applied in a transitive manner, such that a first thread inherits urgency from a second thread via a third thread. A thread may also inherit the urgencies of several other threads. Such inheritance has several important advantages. First, the scheduling result of such inheritance is equitable, in that all work done by or on behalf of the same thread is scheduled with the same urgency. Second, such inheritance obviates the need to specify urgencies for dedicated server threads, as such threads will always inherit the varying urgencies of their clients.

Further, in order to more quickly execute a relatively urgent thread that needs to use a resource, such as a mutex synchronization object, being used by a less urgent thread, the scheduler permits the less urgent thread to inherit the urgency of the more urgent thread until the less urgent thread releases the resource. This permits the thread that has inherited the urgency of the more urgent thread to run to the exclusion of more of the ready threads until it releases the resource, at which time the thread that has inherited the urgency of the more urgent thread loses the urgency of the more urgent thread, the more urgent thread becomes ready, and the more urgent thread replaces the less urgent thread as the new running thread.

Further, when operating in computer systems having more than one processor, the scheduler is preferably able to schedule the execution of threads on as many of the processors as desired.

DETAILED DESCRIPTION OF THE INVENTION

Figure 1:
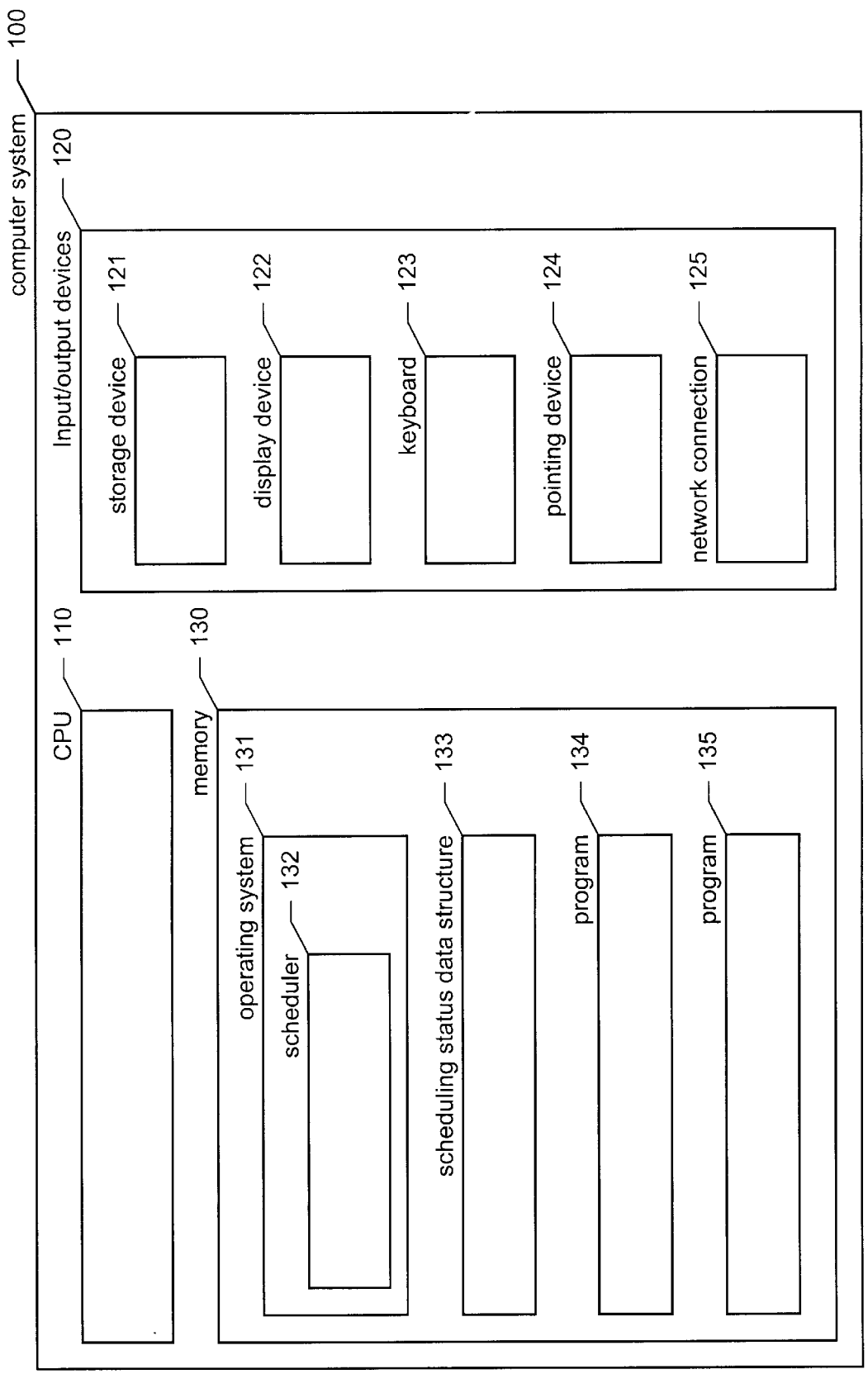
FIG. 1 is a high-level block diagram of the general-purpose computer system upon which the scheduler preferably operates.

A method and system for scheduling the execution of threads using optional time-specific scheduling constraints is provided. In a preferred embodiment, a thread scheduling software facility ("the scheduler") uses a unified urgency indicator to schedule the execution of each of a plurality of threads present in a computer system. While the description that follows is directed to the use of the scheduler to schedule the use of one or more processors, it will be appreciated by those skilled in the art that the scheduler may be straightforwardly adapted to schedule the use of other resources comprised of either hardware or software. The scheduler maintains an urgency indicator for each thread based either on a time-specific scheduling constraint that specifies an absolute deadline for a specified quantity of work or on a time-general scheduling constraint that specifies a percentage of processor time to be dedicated to the thread, depending on which type of scheduling constraint is specified for the thread. Modem multimedia applications demand that particular quantities of work be consistently scheduled in a timely fashion for acceptable performance, and their threads are examples of threads for which time-specific scheduling constraints are specified. Modern applications generally also specify time-general scheduling constraints for their threads, which specify the percentage of processor time to be dedicated to the execution of the thread in the long term. Many older legacy programs, on the other hand, specify only time-general scheduling constraints for their threads. If no scheduling constraints are specified for a thread, the facility, or another entity such as the operating system, preferably specifies a default time-general scheduling constraint so that the scheduler permits the thread to execute. The threads scheduled by the scheduler preferably include threads for performing device interrupt handling, so that device interrupt handling is scheduled against the tasks performed by other executing programs.

The indications of urgency used by the scheduler to prioritize the execution of threads are time-sensitive, and reflect the importance of executing a thread at a particular time rather than solely the overall importance of a thread. The scheduler preferably utilizes "restart times" as such indications of urgency. Restart times represent urgency in a time-sensitive way by measuring the time at which a thread needs to begin exclusive execution in order to satisfy a deadline specified for the thread. Given the likelihood that a particular thread will not be allowed to execute exclusively, a thread generally must begin execution substantially before its restart time in order to successfully complete its scheduling constraints. Restart times, however, do reflect the relative priority, or time-sensitive urgency, of a number of threads—the thread with the earliest restart time is the most urgent thread, the thread with the second earliest restart time is the second most urgent thread, etc. The scheduler's use of restart times as indications of urgency is consistent with a minimum laxity first approach, in which threads with the minimum scheduling flexibility are scheduled first. The indications of urgency used by the scheduler preferably also include an indication of criticality. If a thread is critical, it is more urgent than all non-critical threads. If two threads are both critical, the thread with the earlier restart time is more urgent. Criticality is generally used by threads to identify situations in which the degradation of their performance would be unacceptable.

Instead of allocating processor time in fixed-length time slices, the scheduler preferably utilizes custom timer interrupts to assign the processor to a thread for a period of time tailored to reduce the urgency of that thread to slightly below the urgency of the next most urgent thread, or until a more urgent thread becomes ready. This aspect of the invention minimizes the processor time spent scheduling the processor, or "scheduling latency," as the facility may efficiently allocate the processor to a thread for the appropriate amount of time without having to interrupt the thread to reevaluate the schedule.

The scheduler further supports the inheritance of urgency from threads for which a service is being performed (client threads) by threads that are performing that service (server threads). Server threads can include those threads invoked by local and network remote procedure calls and those threads utilized to process device interrupts. Such inheritance may be applied in a transitive manner, such that a first thread inherits urgency from a second thread via a third thread. A thread may also inherit the urgencies of several other threads. Such inheritance has several important advantages. First, the scheduling result of such inheritance is equitable, in that all work done by or on behalf of the same thread is scheduled with the same urgency. Second, such inheritance obviates the need to specify urgencies for dedicated server threads, as such threads will always inherit the varying urgencies of their clients.

Further, in order to more quickly execute a relatively urgent thread that needs to use a resource, such as a mutex synchronization object, being used by a less urgent thread, the scheduler permits the less urgent thread to inherit the urgency of the more urgent thread until the less urgent thread releases the resource. This permits the thread that has inherited the urgency of the more urgent thread to run to the exclusion of more of the ready threads until it releases the resource, at which time the thread that has inherited the urgency of the more urgent thread loses the urgency of the more urgent thread, the more urgent thread becomes ready, and the more urgent thread replaces the less urgent thread as the new running thread.

Further, when operating in computer systems having more than one processor, the scheduler is preferably able to schedule the execution of threads on as many of the processors as desired.

FIG. 1 is a high-level block diagram of the general-purpose computer system upon which the scheduler preferably operates. The computer system 100 contains one or more central processing units (CPU) 110, input/output devices 120, and a computer memory (memory) 130. Among the input/output devices 120 is a storage device 121, such as a hard disk drive; a display device 122, such as a video monitor; a keyboard 123; a pointing device 124, such as a mouse; and a network connection 125, through which the computer system 100 may communicate with other connected computer systems (not shown). The memory 130 preferably contains an operating system 131, which preferably executes on the CPU 110 and includes the thread scheduling facility (the scheduler) 132. The memory 130 further contains a scheduling status data structure 133 used by the scheduler 132, as well as additional programs such as programs 134 and 135 whose threads are executed by the computer system. While the scheduler is preferably implemented on a computer system configured as described above, one skilled in the art will recognize that it may also be implemented on computer systems having different configurations.

When each thread is created, the scheduler generally receives a time-general scheduling constraint identifying the thread and specifying an overall percentage of processing time to be committed to the thread (or "CPU reservation"). Programs that were developed to support a scheduler utilizing time-general scheduling constraints generally submit a time-general scheduling constraint for each of their threads. In some cases, such programs submit a single time-general scheduling constraint specifying a single CPU reservation for all of its threads to a central resource manager program, which passes this information to the scheduler. The scheduler then assigns individual threads within the program CPU reservations out of the program's reservations, for instance, by evenly dividing the program reservation among the program's threads. For a more complete description of thread scheduling in conjunction with such a central resource manager mechanism, the reader should refer to U.S. patent application Ser. No. 08/569,048, "METHOD AND SYSTEM FOR SCHEDULING THE USE OF ONE OR MORE COMPUTER SYSTEM RESOURCE USING A RESOURCE PLANNER AND A RESOURCE PROVIDER," which is filed concurrently herewith and is hereby incorporated by reference. For programs that were not developed to support a scheduler utilizing time-general scheduling constraints, the operating system (or whatever entity is used within the computer system to launch such programs) preferably submits a time-general scheduling constraint for each of the program's threads. A thread may preferably submit updated time-general scheduling constraints specifying new CPU reservations at any time during its execution.

Subsequent to receiving a time-general scheduling constraint for a thread, if the program that created the thread was developed to support a scheduler utilizing time-specific scheduling constraints, the scheduler may receive one or more time-specific scheduling constraints for the thread. Such time-specific scheduling constraints are preferably submitted to the scheduler by calling a BeginConstraint API supported by the scheduler. Each time-specific scheduling constraint identifies the thread for which it is submitted and specifies, for a block of code about to be executed by that thread; a deadline by which the block of code must complete execution ("deadline"); an estimate of the amount of dedicated processor time the block of code will require to complete execution ("estimate"); an indication of whether the thread is critical ("criticality"), i.e., whether failure to complete the execution of the block of code would be unacceptable to the user; and a start time before which the thread should not be further executed. The scheduler may decline a time-specific scheduling constraint where it would be impossible to complete the time-specific scheduling constraint within the bounds of the thread's time-general scheduling constraint, or, less restrictively, where it would be impossible to complete the time-specific scheduling constraint utilizing a larger percentage of processor time than is specified by the CPU reservation of the thread's time-general scheduling constraint. A thread that submits a time-specific scheduling constraint is expected to withdraw the time-specific scheduling constraint when the block of code to which it corresponds completes execution. A thread preferably withdraws a time-specific scheduling constraint by calling an EndConstraint API supported by the scheduler. In a preferred embodiment, the scheduler autonomously withdraws time-specific scheduling constraints when the processor time expended on them significantly exceeds their estimates.

Figure 2:
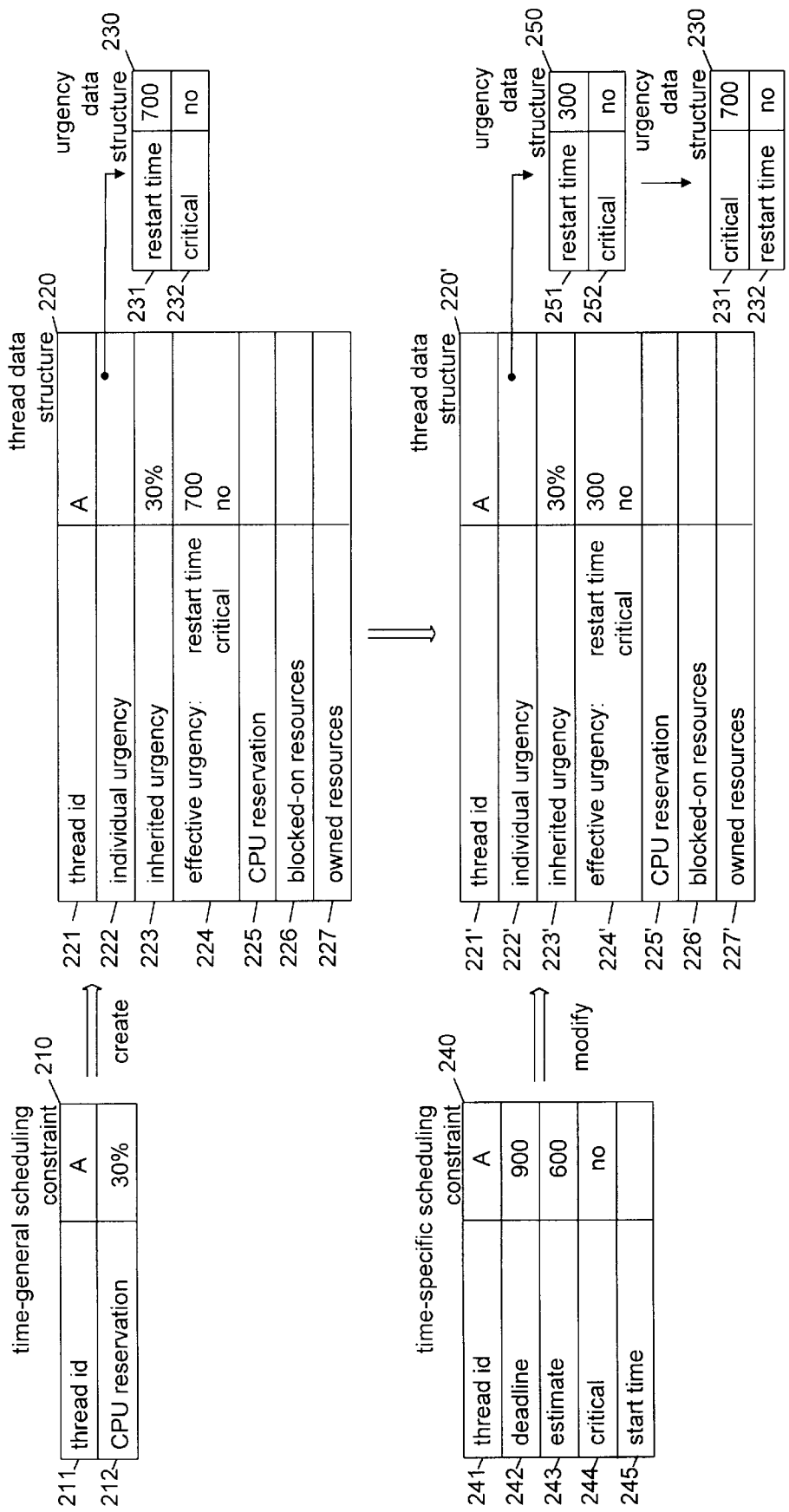
FIG. 2 is a data structure diagram showing the creation and modification of a thread data structure in response to receiving a time-general and a time-specific time constraint for a sample thread.
Figure 3:
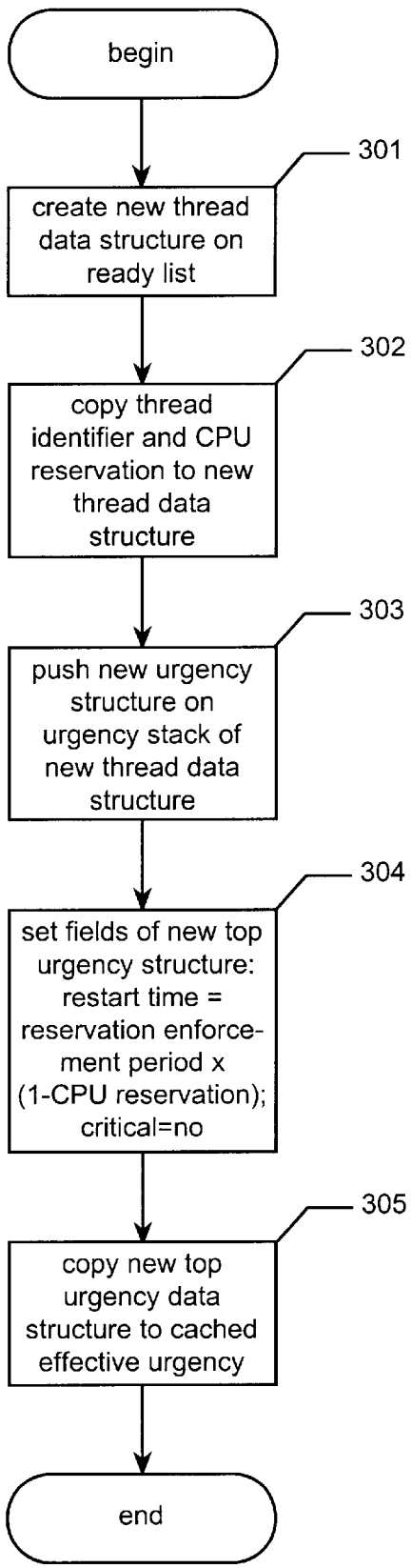
FIG. 3 is a flow diagram showing the steps preferably performed by the scheduler to create a thread data structure when the scheduler receives a time-general scheduling constraint.
Figure 4:
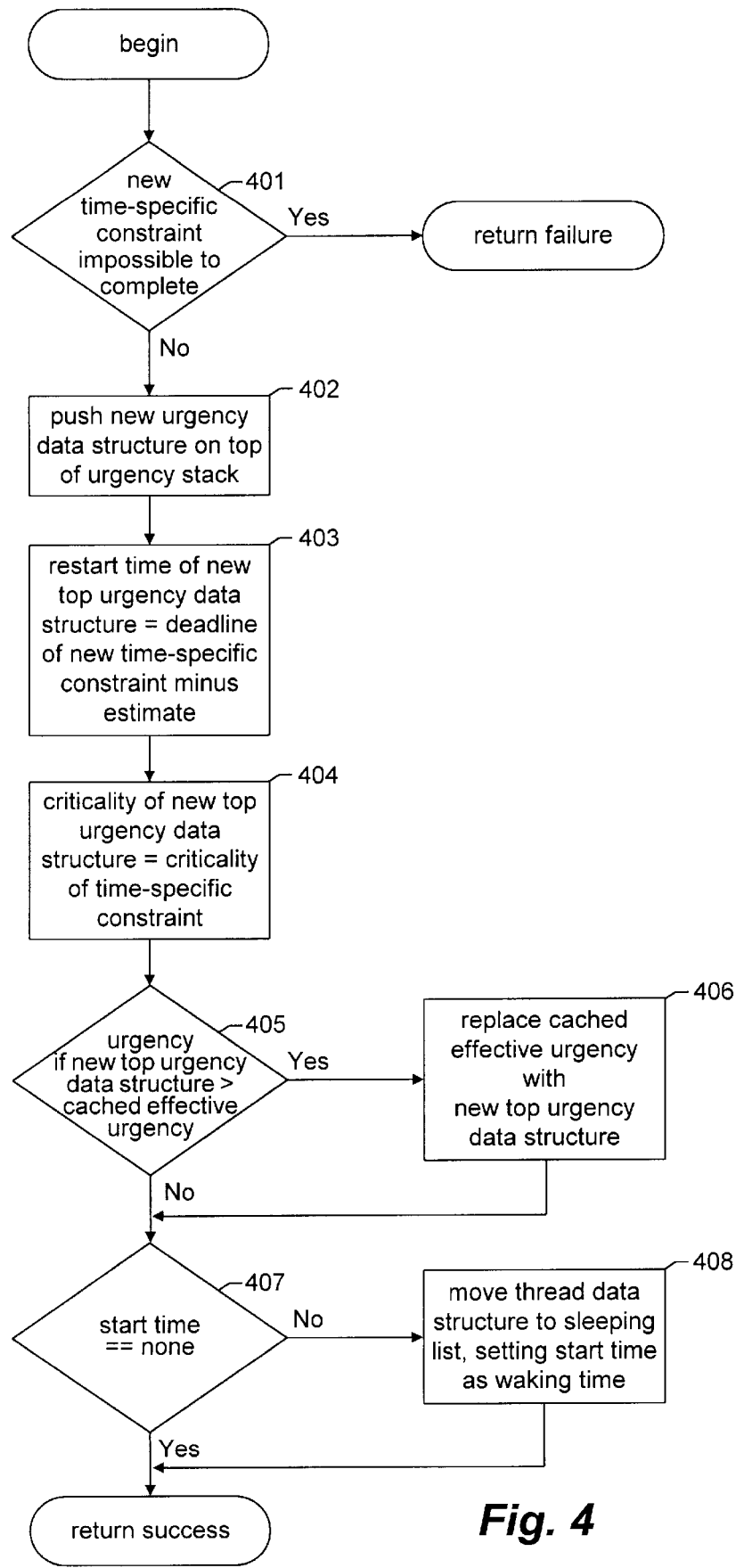
FIG. 4 is a flow diagram showing the steps preferably performed by the scheduler to modify a thread data structure when the scheduler receives a time-specific scheduling constraint.

FIGS. 2–7 illustrate the process of submitting constraints to the scheduler. FIG. 2 is a data structure diagram showing the creation and modification of a thread data structure in response to receiving a time-general and a time-specific time constraint for a sample thread. FIGS. 3 and 4, discussed in detail below, show the steps preferably performed by the scheduler to process new time-general and time-specific time constraints, respectively.

FIG. 2 shows a time-general scheduling constraint 210 submitted to the scheduler for a sample thread. The sample thread preferably submits the time-general scheduling constraint on its own behalf by calling the BeginConstraint API. The time-general scheduling constraint 210 specifies a thread identifier ("thread i.d.") 211 identifying the sample thread (in the case of the sample thread, "A") and a CPU reservation 212 representing an overall percentage of processing time to be committed to the thread (in the case of the sample thread, 30%). In response to receiving the time-general scheduling constraint 210, the scheduler creates a thread data structure 220.

FIG. 3 is a flow diagram showing the steps preferably performed by the scheduler to create a thread data structure when the scheduler receives a time-general scheduling constraint. In step 301, the scheduler creates a new thread data structure such as thread data structure 220 (FIG. 2). As is discussed in greater detail below, the new thread data structure is created on a list of data structures corresponding to threads that are ready to be executed ("the ready list"), which forms a part of a scheduling status data structure used by the scheduler to maintain the status of each thread for scheduling purposes. In step 302, the scheduler copies the thread identifier of the time-general scheduling constraint (such as thread identifier 211) to the thread identifier of the created thread data structure (such as thread identifier 221).

In step 303, the scheduler creates an urgency data structure (such as urgency data structure 330) and pushes it on an individual urgency stack of the created thread data structure (such as individual urgency stack 222). The individual urgency stack of the created thread data structure is a stack of one or more urgency data structures each corresponding to a scheduling constraint submitted by the thread. The most recently stored ("pushed") urgency data structure is said to be the "top" urgency data structure on the individual urgency stack and is used by the scheduler, along with any inherited urgencies, to direct the scheduling of the thread. When the scheduling constraint represented by the top urgency data structure on the individual urgency stack is withdrawn, the top urgency data structure is removed ("popped") from the stack, and the next-most recently pushed urgency data structure becomes the top urgency data structure and is used by the facility, along with any inherited urgencies, to direct the scheduling of the thread. The created urgency data structure specifies a restart time (such as restart time 231) and a criticality (such as criticality 232). In step 304, the scheduler sets the components of the created urgency data structure. The scheduler preferably sets the restart time to a time given by the expression $$(\text{current time}) + ((CPU \text{ reservation enforcement period}) \times$$
$$(1 - (CPU \text{ reservation}))),$$

where (current time) is the time at which the steps are being performed (here 0); (CPU reservation enforcement period) is a constant period of time over which CPU reservations specified in time-general scheduling constraints are observed by the scheduler, preferably set at or near 1 millisecond (ms) or 1000 microseconds ($\mu$s); and (CPU reservation) is the CPU reservation value of the thread data structure (such as CPU reservation 223, 30% or 0.3). For the sample thread, therefore, the restart time 231 is $$(0 + 1000 \times (1 - 0.3)) \ \mu s = 700 \ \mu s.$$

The scheduler preferably sets the criticality (such as criticality 232) of the urgency data structure to not critical ("no"), since time-general scheduling constraints are not generally considered to be critical by the scheduler. The thread data structure 220 further includes an inherited urgency component 223, which preferably contains a reference to the effective urgency component (discussed below) of the thread data structures for any threads from which the thread inherits urgency. For clarity, however, the thread identifiers of threads from which this thread inherits urgency are shown instead of such references. The thread data structure 220 further includes a cached effective urgency component, and which is cached the highest urgency that applies to the thread. The cached effective urgency component is comprised of a restart time and a criticality, and is identified by determining the highest urgency represented by the top individual urgency data structure 230 and the cached effective urgencies of any threads from which this thread inherits urgency. The cached effective urgency is preferably invalidated and recalculated when the highest urgency among the individual and inherited urgencies changes. In step 305, the scheduler copies the new top urgency data structure to the cached effective urgency (such as cached effective urgency 224). The steps shown in FIG. 3 then conclude. The thread data structure 220 further contains a blocked-on resources component 226 and an owned resources component 227, which identify resources that are blocked-on and owned by the thread, respectively.

FIG. 2 further shows a time-specific scheduling constraint 240 submitted to the scheduler for the sample thread. The time-specific scheduling constraint 240 specifies a thread identifier 241 identifying the sample thread (in the case of the sample thread, "A"), a deadline 242 (in the case of the sample thread, 900 $\mu$s), an estimate 243 (in the case of the sample thread, 600 $\mu$s), a criticality 244 (in the case of the sample thread, "no"), and optionally, a start time 245 before which the thread should not be further executed. In response to receiving the time-specific scheduling constraint 240, the scheduler modifies thread data structure 220 to create thread data structure 220'.

FIG. 4 is a flow diagram showing the steps preferably performed by the scheduler to modify a thread data structure when the scheduler receives a time-specific scheduling constraint. In step 401, if the new time-specific constraint is impossible to complete, then the scheduler returns failure for the submission of the time-specific scheduling constraint, else the scheduler continues in step 402. In a first preferred embodiment, the scheduler makes the determination in step 401 by determining whether it would be impossible to complete the time-specific scheduling constraint within the bounds of the thread's time-general scheduling constraint. For example, if a time-specific scheduling constraint that would require 70% of the processing time before its deadline is submitted for a thread having a 15% CPU reservation, the time-specific scheduling constraint is impossible to complete within the thread's time-general scheduling constraint. In a second preferred embodiment, the scheduler makes the determination in step 401 by determining whether it would be impossible to complete the time-specific scheduling constraint utilizing a larger percentage of processor time than is specified by the CPU reservation of the thread's time-general scheduling constraint.

In step 402, the scheduler pushes a new urgency structure (such as new urgency structure 250) onto the top of the individual urgency stack (such as individual urgency stack 222'). In step 403, the scheduler sets the restart time (such as restart time 251) of the new top urgency structure (such as the new top urgency structure 250) to a time given by the expression (deadline)−(estimate).

For the sample thread, therefore, the restart time 251 is (900−600) $\mu$s=300 $\mu$s.

In step 404, the scheduler sets the criticality (such as criticality 252) of the new top urgency data structure (such as the new top urgency data structure 250) to the criticality (such as criticality 244) of the time-specific scheduling constraint (such as time-specific scheduling constraint 240). In step 405, if the urgency represented by the new top urgency data structure is higher than the cached effective urgency for the thread, then the scheduler continues at step 406 to replace the cached effective urgency with the new top urgency data structure. In step 407, if a start time is specified in the time-specific scheduling constraint, then the scheduler continues at step 408. In step 408, the scheduler moves the thread data structure for this thread to a sleeping list, which contains any thread that has made an implicit or explicit request to "sleep," or not be scheduled for execution, until a future time. In step 408, the scheduler further sets the time at which the thread will be woken and moved from the sleeping list to the ready list as the start time specified in the time-specific scheduling constraint. The scheduler then returns success for the submission of the time-specific scheduling constraint, and the steps shown in FIG. 4 conclude. When the scheduler receives multiple time-specific scheduling constraints for the same thread, it nests urgency data structures corresponding to each time-specific scheduling constraint on the individual urgency stack for the thread.

Figure 5:
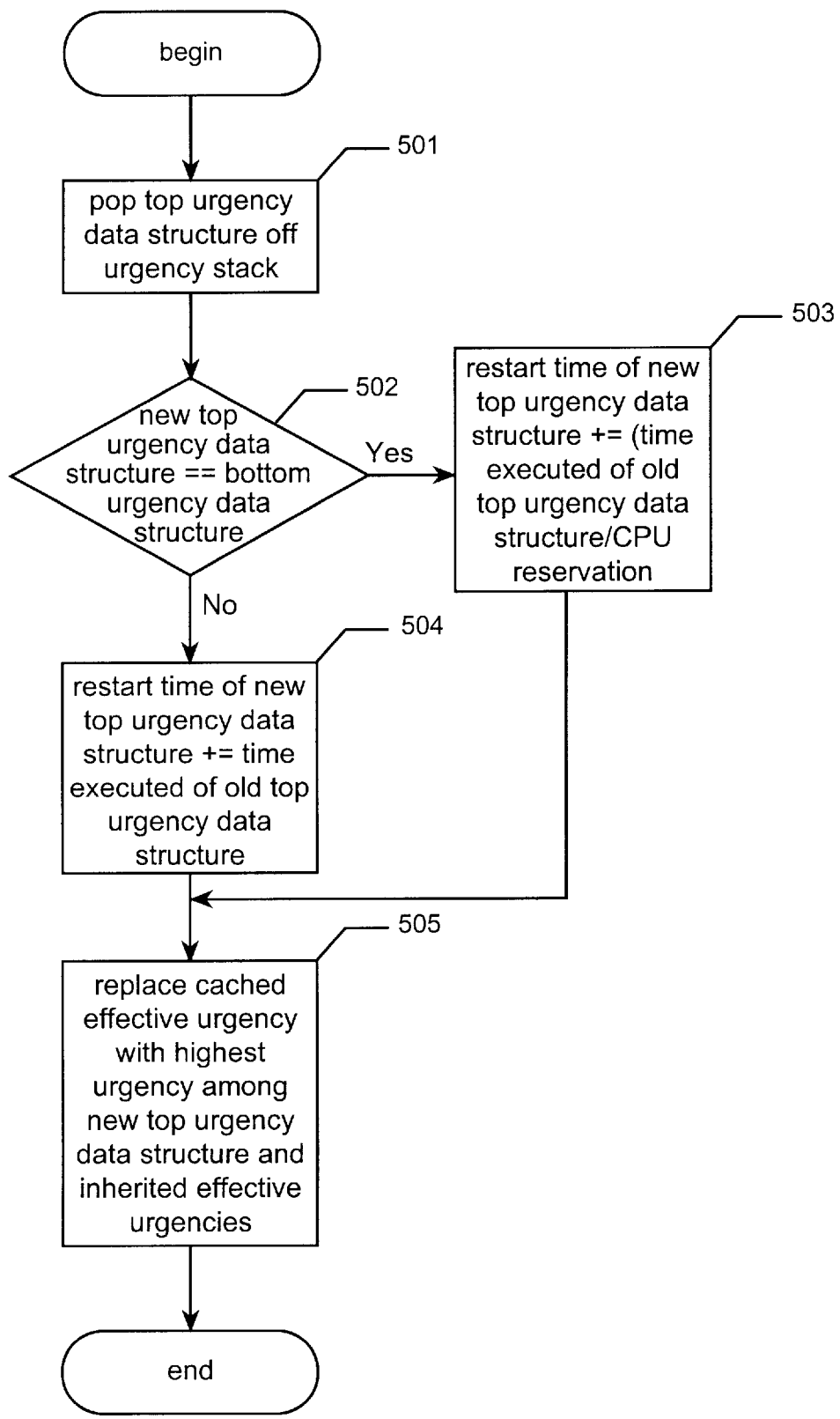
FIG. 5 is a flow diagram showing the steps preferably performed by the scheduler to withdraw a time-specific scheduling constraint when the scheduler receives a request to do so.

FIG. 5 is a flow diagram showing the steps preferably performed by the scheduler to withdraw a time-specific scheduling constraint when the scheduler receives a request to do so. A thread submits such a request when it completes the execution of the block of code to which the time-specific scheduling constraint corresponds. In step 501, the scheduler pops the top urgency data structure off of the individual urgency stack for the thread identified in the request to withdraw the time-specific scheduling constraint. In step 502, if the new top urgency data structure on the individual urgency stack is also the bottom urgency data structure on the individual urgency stack, and is therefore the urgency data structure corresponding to the time-general scheduling constraint, then the scheduler continues in step 503, else the new top urgency data structure corresponds to a time-specific scheduling constraint and the scheduler continues in step 504. In step 503, the scheduler increments the restart time of the new top urgency structure (corresponding to the time-general scheduling constraint) by the time executed for the old top urgency data structure divided by the CPU reservation for the thread. In step 504, the scheduler increments the restart time of the new top urgency structure (corresponding to a time-specific scheduling constraint) by the time executed for the old top urgency data structure. In step 505, the scheduler replaces the cached effective urgency of the thread with the highest urgency among the thread's new top urgency data structure and the inherited effective urgencies. After step 505, the steps shown in FIG. 5 conclude.

Figure 6A:
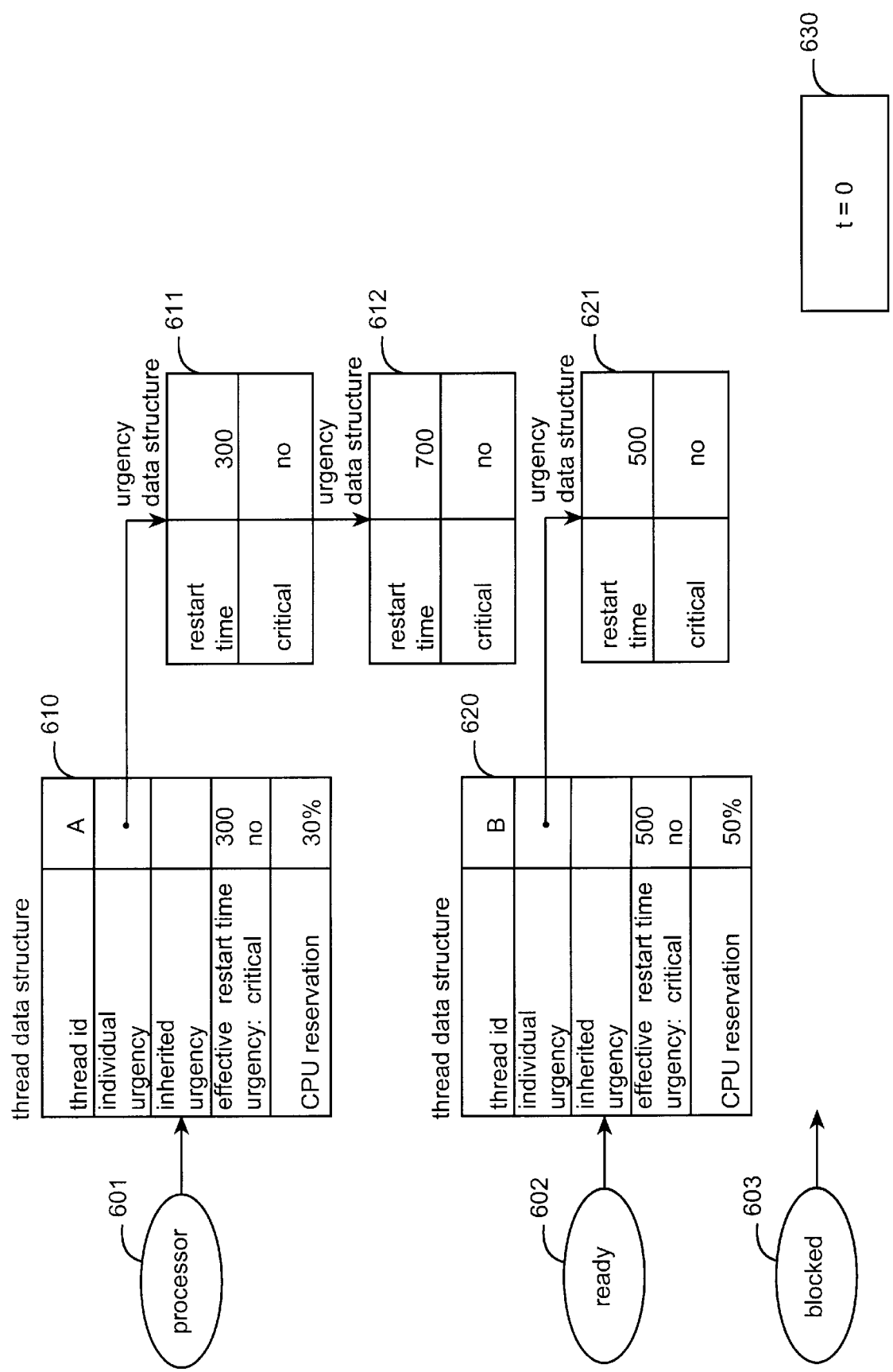
FIGS. 6A–6M are data structure diagrams showing the contents of the scheduling status data structure at various times during the scheduling of two sample threads.

The facility equitably schedules both threads for which time-specific scheduling constraints have been submitted and threads for which time-specific scheduling constraints have not been submitted. FIGS. 6A–6M are data structure diagrams showing the contents of the scheduling status data structure at various times during the scheduling of two sample threads. FIG. 6A is a data structure diagram showing the initial contents of the scheduling status data structure. The scheduling status data structure is comprised of three linked lists of thread data structures: a processor list 601 containing one thread that presently being executed on the processor; a blocked list 603 containing the threads that are blocked on one or more resources; and a ready list 602 containing any thread not on the processor list or the blocked list, i.e., any thread that is ready to execute but not currently executing. The scheduling status data structure also preferably contains a sleeping list (now shown) for containing threads that have requested to sleep until a specified future wake-up time. At the specified future wake-up time, the scheduler preferably moves such a thread from the sleeping list to the ready list. In computer systems in which the scheduler is scheduling multiple processors, the scheduler preferably maintains one processor list like processor list 601 for each such processor. For n such processors, the processor lists together contain the n most urgent ready threads.

The thread data structures shown on lists 601, 602, and 603 and their urgency data structures are abbreviated to show only their relevant components. The diagram shows that the thread data structure 610 for thread A is on the processor list, and the thread data structure 620 for thread B is on the ready list. Thread A has a CPU reservation of 30%, does not have any inherited urgencies, and is operating under a time-specific scheduling constraint. Its restart time is 300 $\mu$s, and it is not critical. Thread B has a higher CPU reservation of 50%, it does not have any inherited urgencies, its restart time is 500 $\mu$s, and it is not critical. A current time indication 630 shows that FIG. 6A represents the contents of the scheduling status data structure at time 0 $\mu$s.

Figure 7:
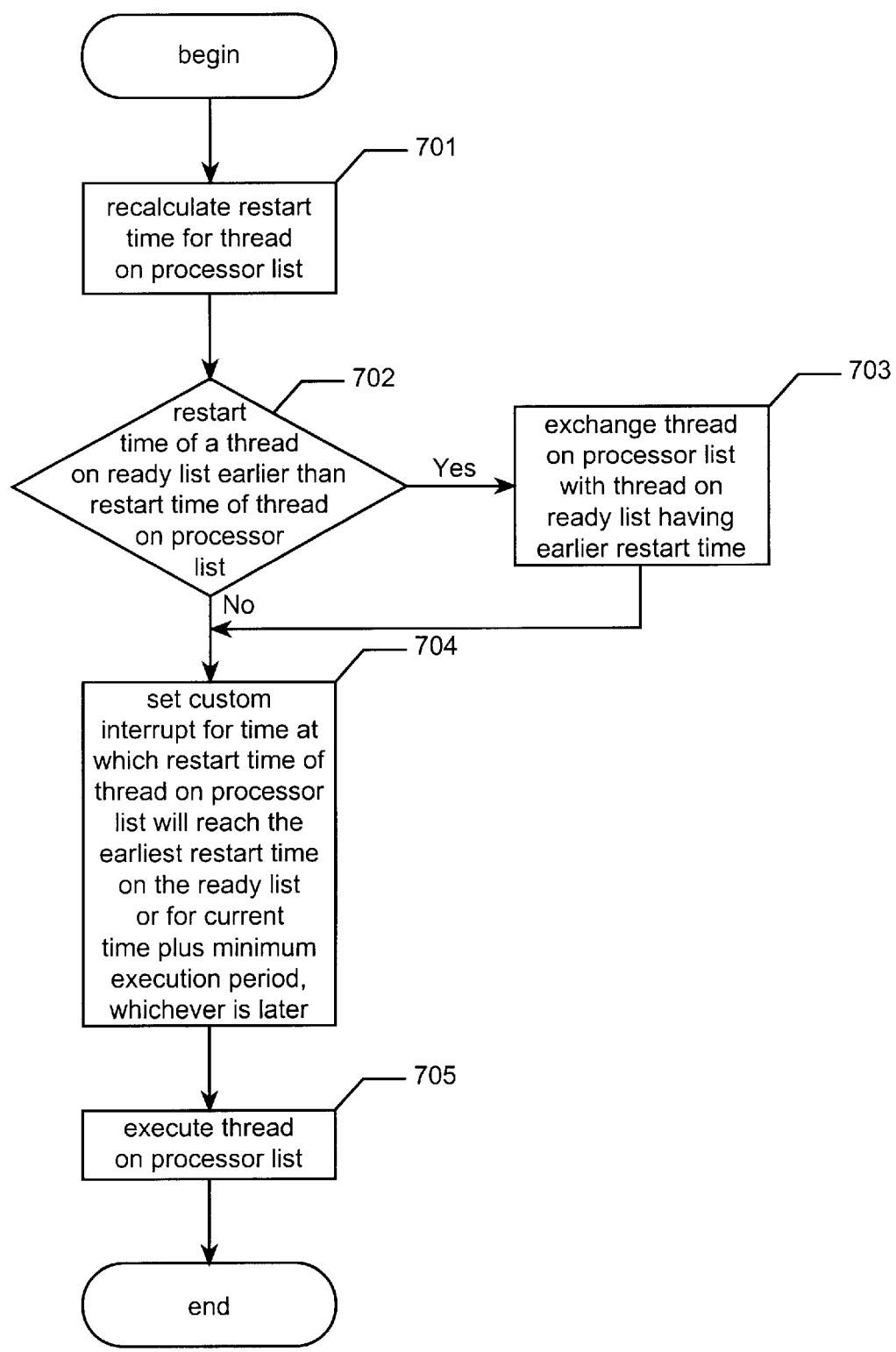
FIG. 7 is a flow diagram showing the steps preferably performed by the scheduler to update the scheduling status data structure.

FIG. 7 is a flow diagram showing the steps preferably performed by the scheduler to update the scheduling status data structure. The scheduler preferably performs the steps shown in FIG. 7 when an event occurs that could make a thread a thread ready or increase its urgency. Such events include the submission or withdrawal of a scheduling constraint for a new or existing thread and the release of a resource, including the signaling of a condition. In cases in which the scheduler is scheduling multiple processors, the steps shown in FIG. 7 are performed at different times for each such processor. In cases in which the scheduler is scheduling multiple processors and an event that could make a thread ready occurs on a processor other than the processor that is executing the lowest-urgency thread, however, instead of it self-performing the steps shown in FIG. 7, the processor on which the event occurs preferably directs an inter-processor interrupt to the processor that it is executing the lowest urgency thread, causing the processor that is executing the lowest urgency thread to perform the steps shown in FIG. 7. In step 701, the scheduler recalculates the restart time for the thread on the processor list. If the top urgency data structure on the individual urgency stack for the thread on the processor list is also the bottom urgency data structure on the individual urgency stack, this urgency data structure corresponds to the thread's time-general scheduling constraint, and its restart time is incremented in step 701 by a time given by the expression (time executed)/(CPU reservation), where (time executed) is the time that the thread executed since the last time its restart time was recalculated, and where (CPU reservation) is the CPU reservation value of the thread. If, on the other hand, the top urgency data structure on the individual urgency stack for the thread on the processor list is not also the bottom urgency data structure on the individual urgency stack, this top urgency data structure corresponds to a time-specific scheduling constraint, and the thread's restart time is incremented in step 701 by a time given by the expression (time executed).

In step 702, if the earliest restart time among the threads on the ready list is earlier than the restart time of the thread on the processor list, then the scheduler continues at step 703, else the scheduler continues at step 704. In step 703, the scheduler moves the thread on the processor list to the ready list, and moves the thread having the earliest restart time on the ready list to the processor list. In step 704, the scheduler sets a custom interrupt to interrupt the execution of the thread on the processor list to allow a different thread to be executed. The scheduler sets the custom interrupt for the later of: (1) the time at which after the restart time of the thread on the processor will exceed the next earliest restart time among the threads on the ready list (2) the current time plus a minimum execution period. The minimum execution period is preferably chosen short enough so that the ready threads all execute within a reasonably short period of time and long enough to minimize the processor time expended on executing the steps shown in FIG. 7. The minimum execution period is therefore preferably chosen at or near 100 $\mu$s. In step 705, the scheduler executes the thread on the processor list. The steps shown in FIG. 7 then conclude. While the thread on the processor list is executing, the custom interrupt could occur, causing the scheduler to again perform the steps shown in FIG. 7. Alternatively, the thread on the processor list could block on or release a resource, causing the scheduler to perform the steps shown in FIGS. 10 and 11 respectively, which are discussed in greater detail below.

Because the restart time of thread A, 300 $\mu$s, is earlier than the restart time of thread B, 500 $\mu$s, the scheduler retains thread A on the processor list and sets a custom interrupt for the time at which the restart time of thread A will be later than the restart time of thread B. Because thread A is operating under a time-specific scheduling constraint, after it is executed, the scheduler increments its restart time by (time executed).

In order to advance thread A's restart time to 500 $\mu$s, the scheduler executes thread A for 200 $\mu$s (target restart time 500 $\mu$s–current restart time 300 $\mu$s). The scheduler therefore sets a custom interrupt for 200 $\mu$s in the future, or t=200 $\mu$s (t=current time 0 $\mu$s+200 $\mu$s).

Figure 6B:
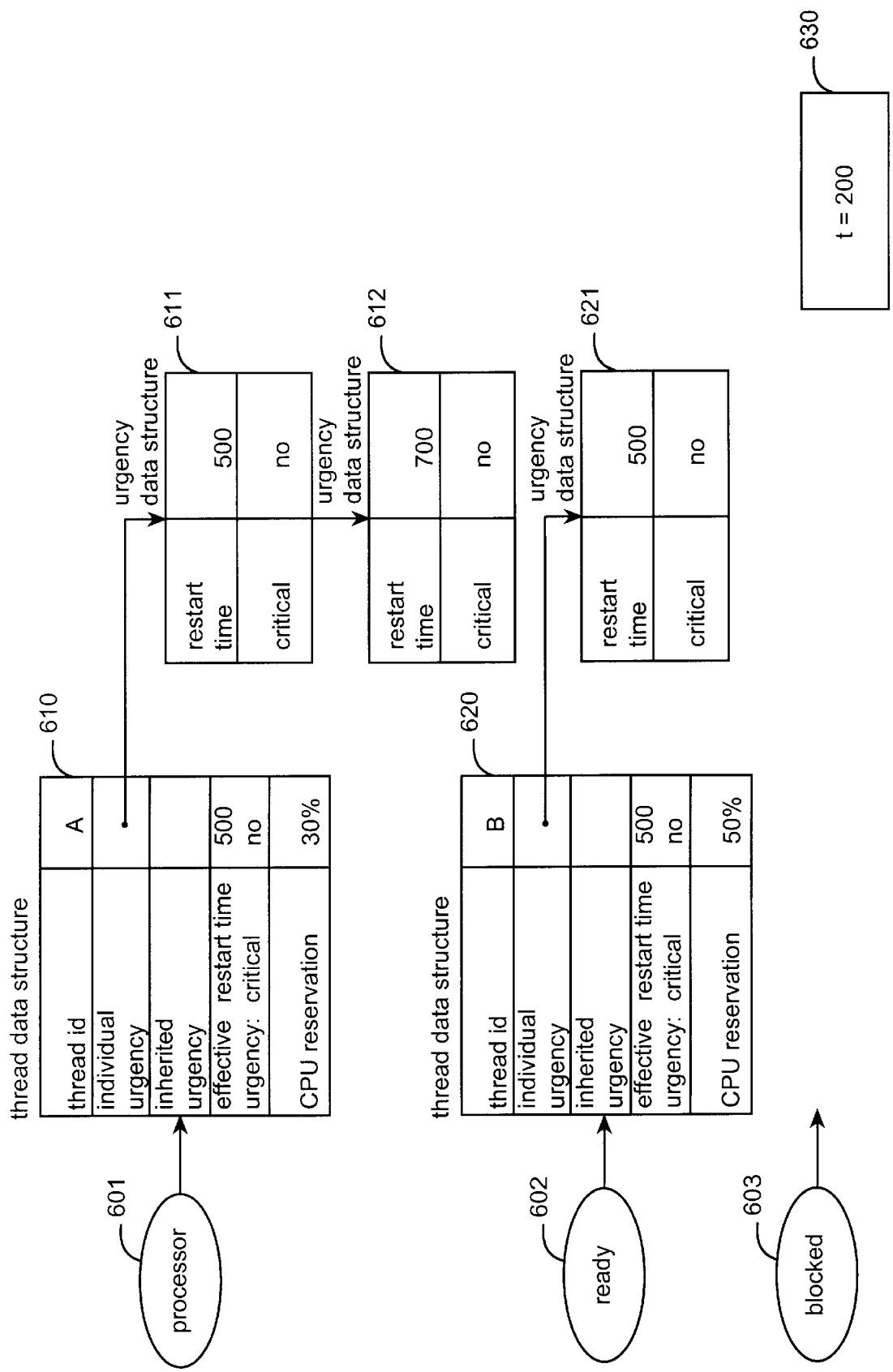

FIG. 6B is a data structure diagram showing the scheduling status data structure after the scheduler has executed thread A for 200 $\mu$s. FIG. 6B shows that, after executing thread A for 200 $\mu$s, the scheduler has incremented thread A's restart time by 200 $\mu$s to 500 $\mu$s.

Figure 8:
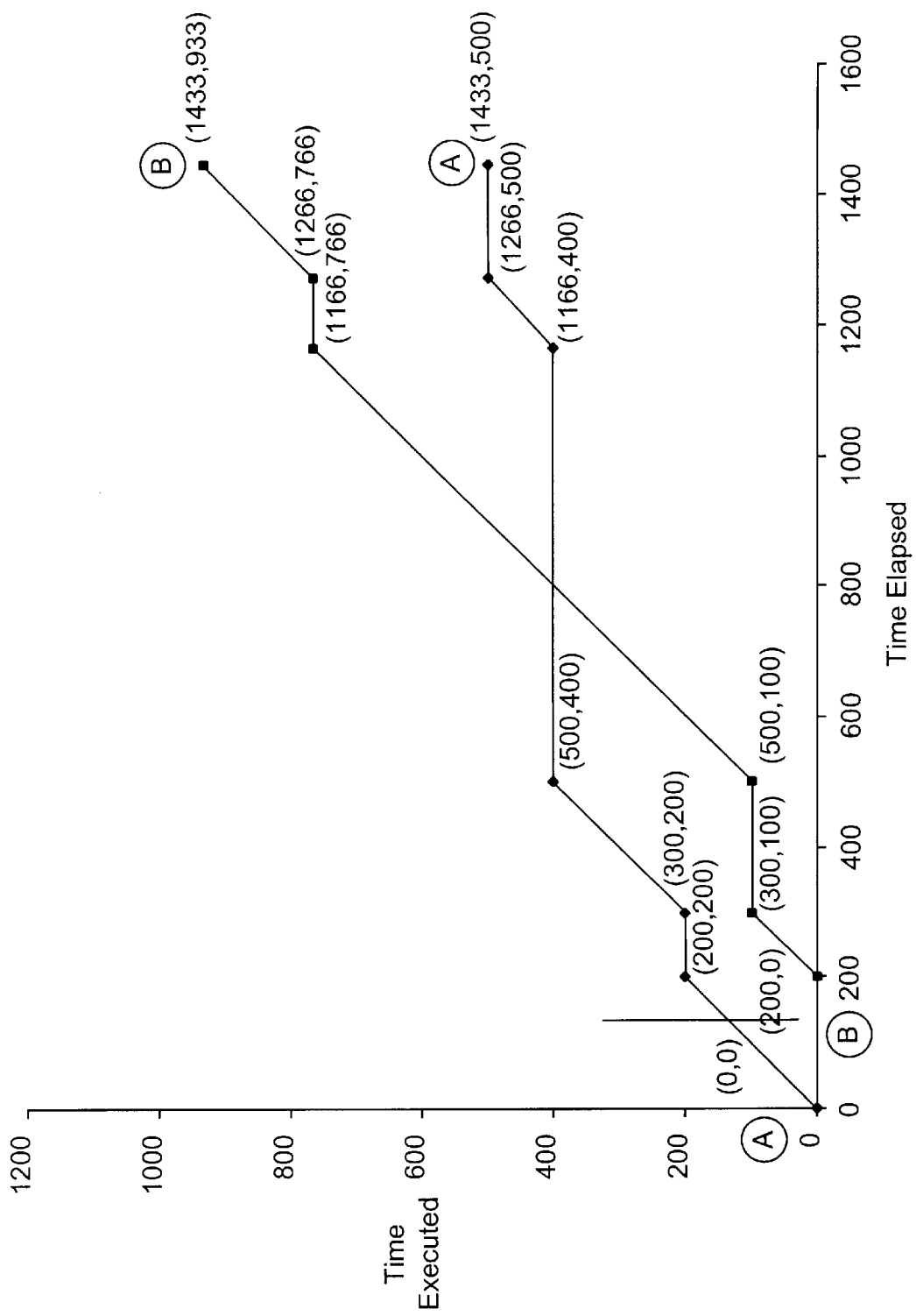
FIG. 8 is a timing graph showing the time executed of the threads whose scheduling is shown in FIGS. 6A–6M.

FIG. 8 is a timing graph showing the time executed of the threads whose scheduling is shown in FIGS. 6A–6M. The graph shows time executed on the vertical axis versus time elapsed on the horizontal axis for threads A and B. While a thread is being executed (i.e., on the processor list), its time executed grows at the same rate as time elapsed. For example, while thread A is executing during the period of t=0 to 200 $\mu$s, its time executed increases from 0 $\mu$s to 200 $\mu$s. While a thread is not being executed (e.g., on the ready list), its time executed remains constant. For example, while thread A is not being executed during the period of t=200 to 300 $\mu$s, its time executed remains at 200 $\mu$s. The graph conveys time executed data from the scheduling example shown in FIGS. 6A–6M in this manner as an overview of the example.

Figure 6C:
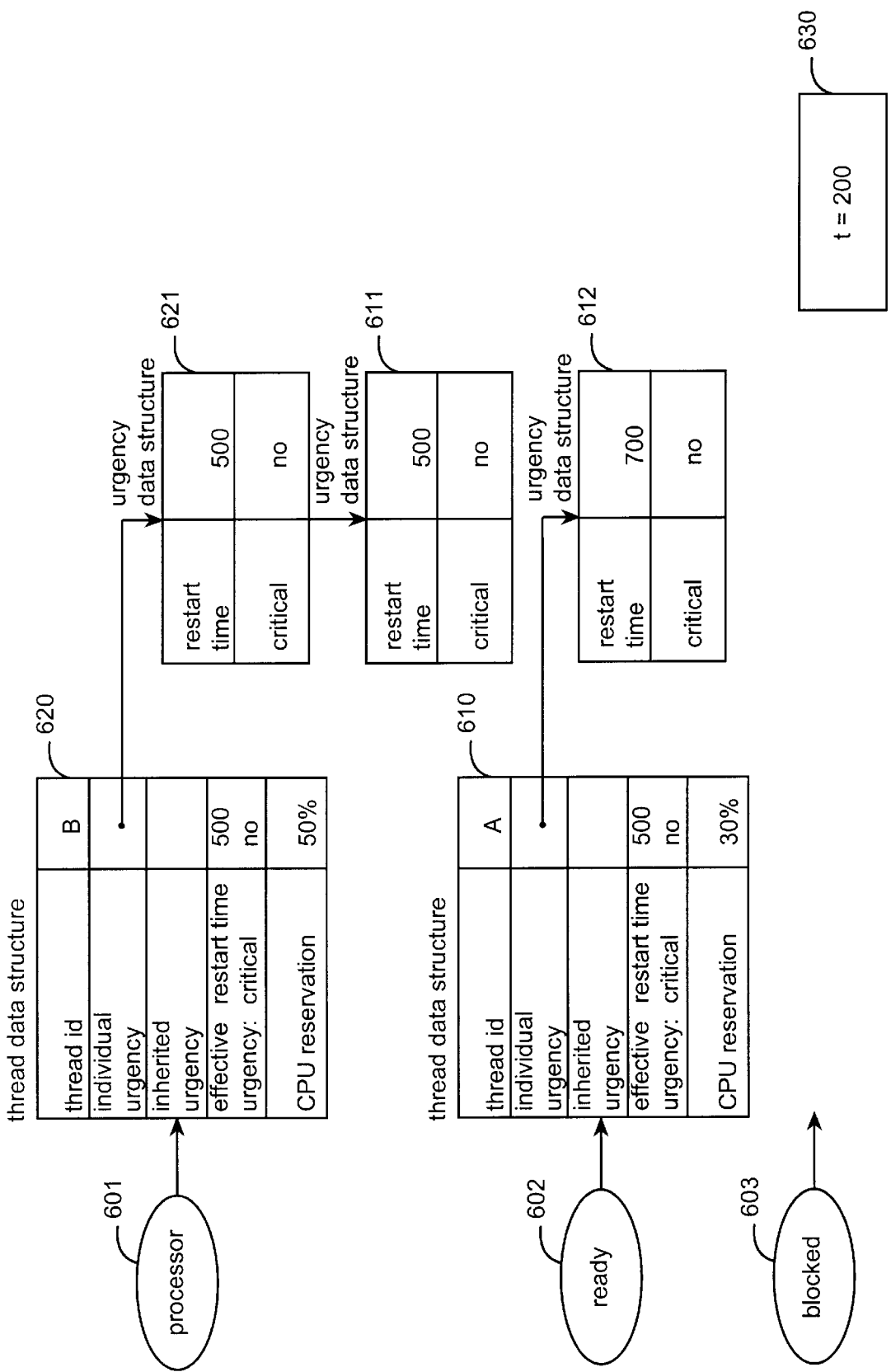
Figure 6D:
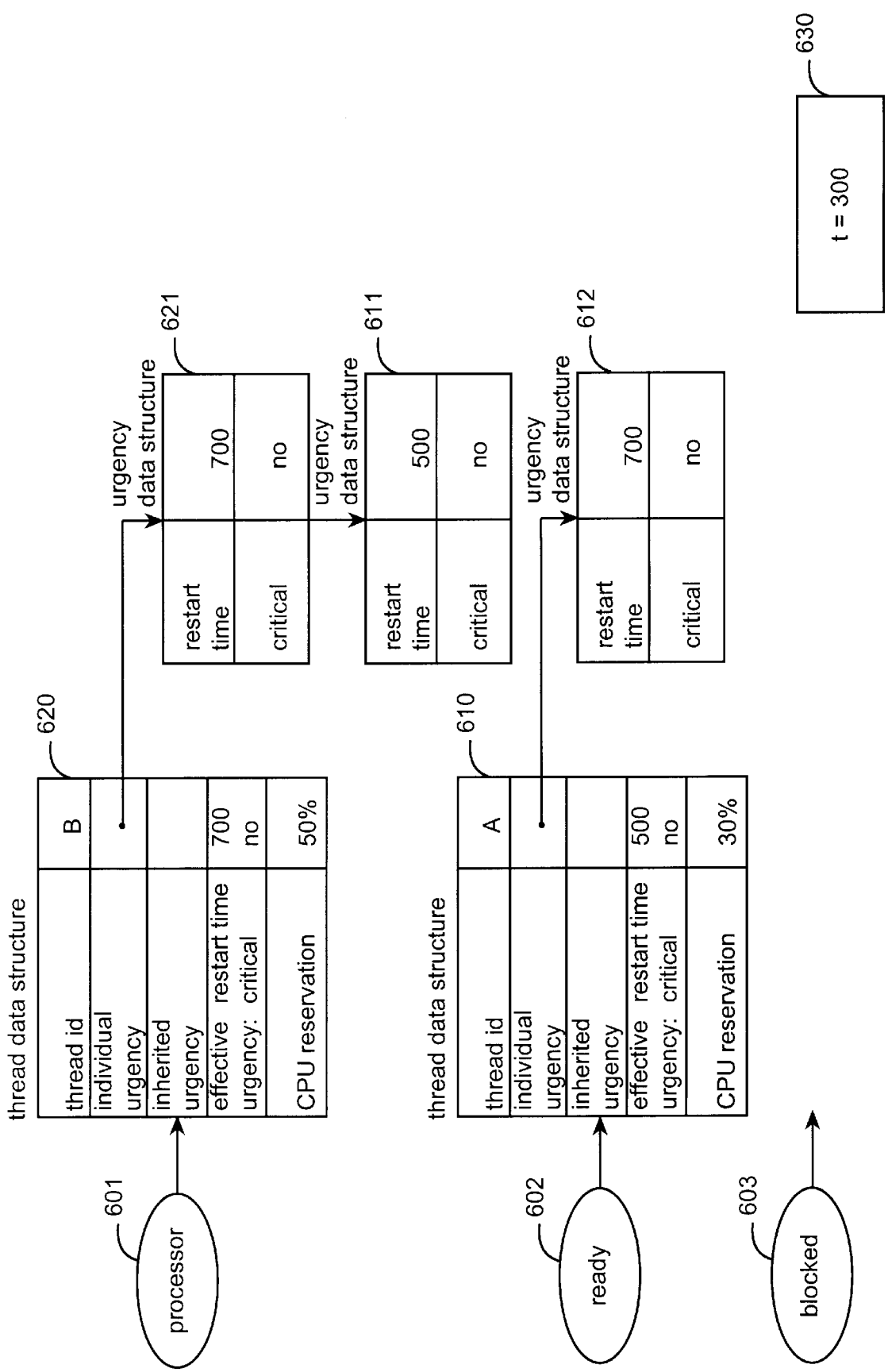

FIG. 6C is a data structure diagram showing the scheduling status data structure after the scheduler has moved thread B from the ready list to the processor list and thread A from the processor list to the ready list. FIG. 6D is a data structure diagram showing the scheduling status data structure after the scheduler has executed thread B for the minimum execution period, 100 μs (at t=200 μs setting a custom interrupt for t=300 μs). At t=200 μs, the scheduler has incremented thread B's restart time by, because B is not subject to a time-specific scheduling constraint, (time executed)/(CPU reservation), or 100 μs/50%=200 μs, from 500 μs to 700 μs.

Figure 6E:
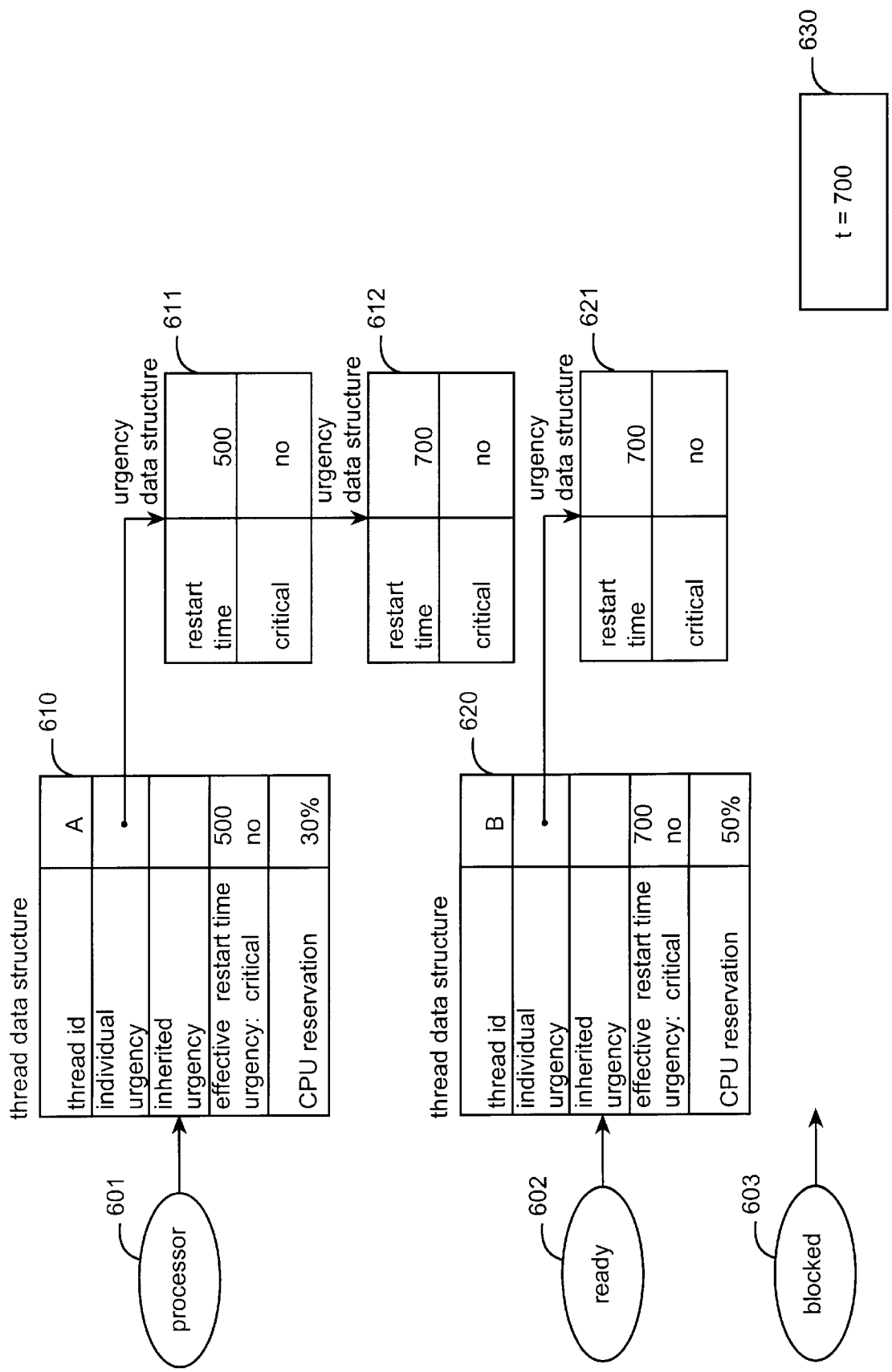
Figure 6F:
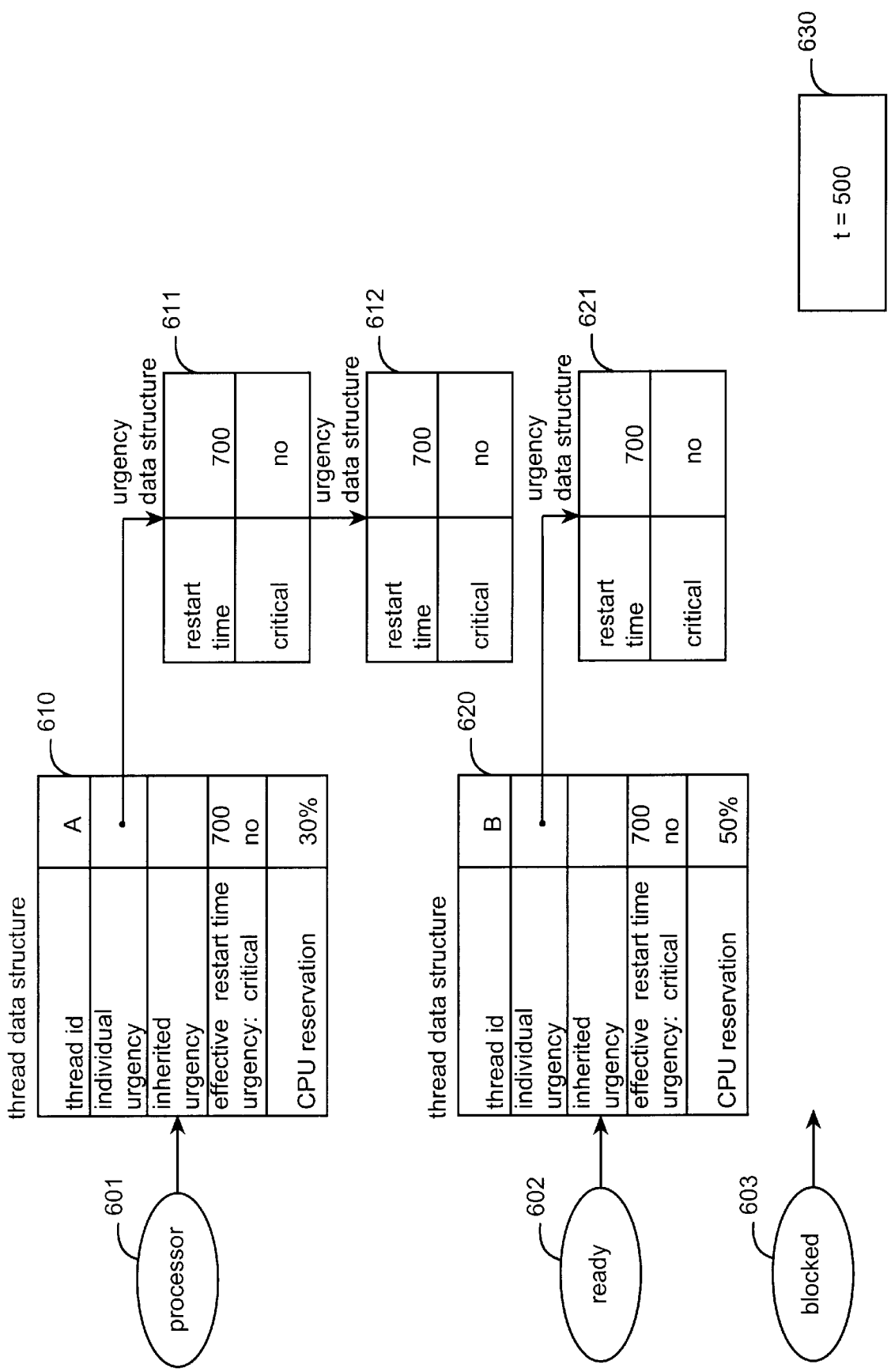

FIG. 6E is a data structure diagram showing the scheduling status data structure after the scheduler has moved thread A from the ready list to the processor list and thread B from the processor list to the ready list. FIG. 6F is a data structure diagram showing the scheduling status data structure after the scheduler has executed thread A for 200 μs to increase the restart time of thread A from 500 μs at t=300 μs to 700 μs at t=500 μs.

Figure 6G:
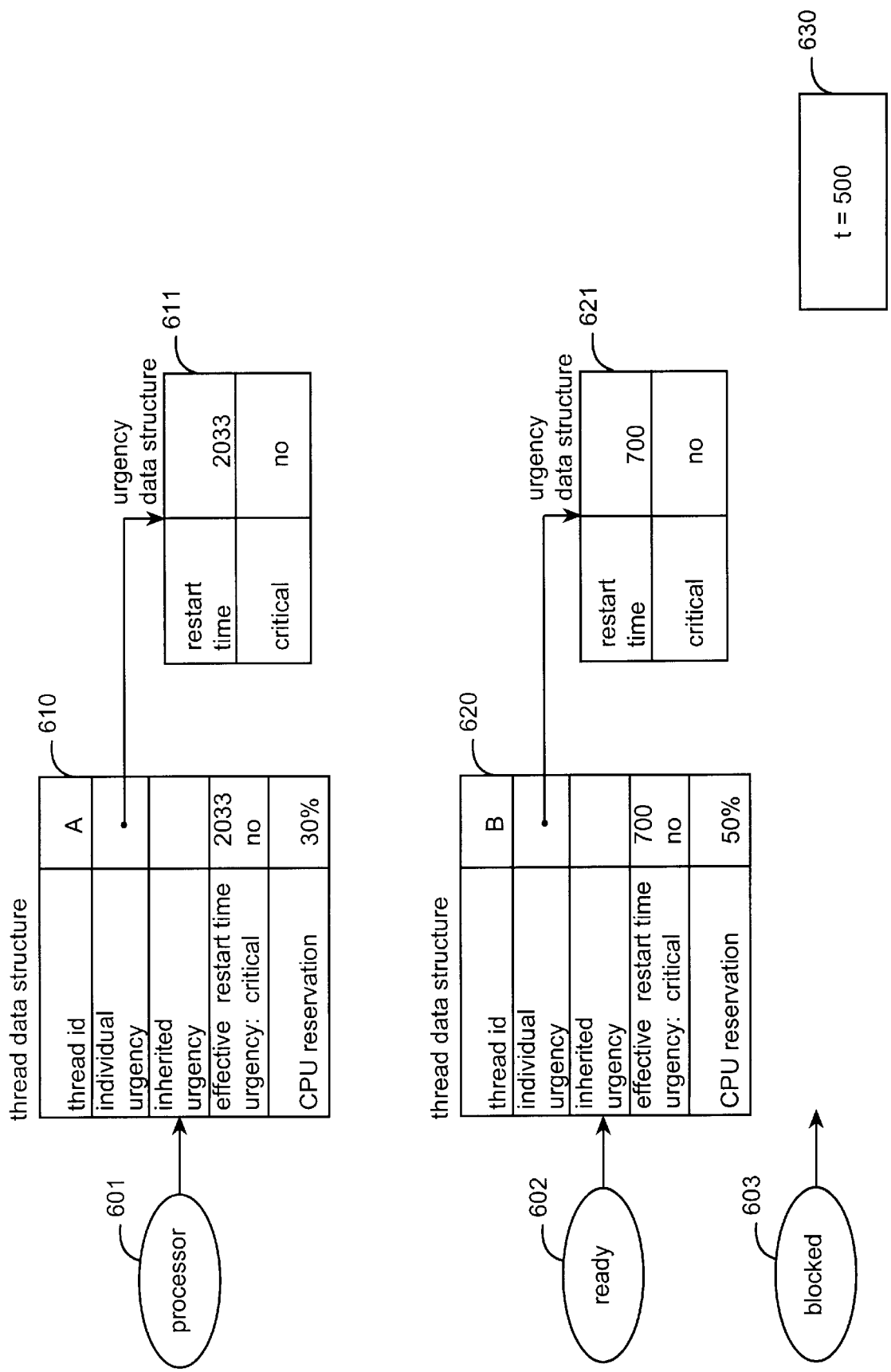

At t=500 μs, thread A completes its time-specific scheduling constraint. FIG. 6G is a data structure diagram showing the scheduling status data structure after the scheduler has removed the urgency data structure corresponding to thread A's only time-specific scheduling constraint and adjusted the remaining urgency data structure accordingly. FIG. 6G shows that the scheduler incremented the restart time of the bottom urgency data structure of thread A's individual urgency stack by (time executed)/(CPU reservation), or 400 μs/30%=1333 μs, from 700 μs to 2033 μs.

Figure 6H:
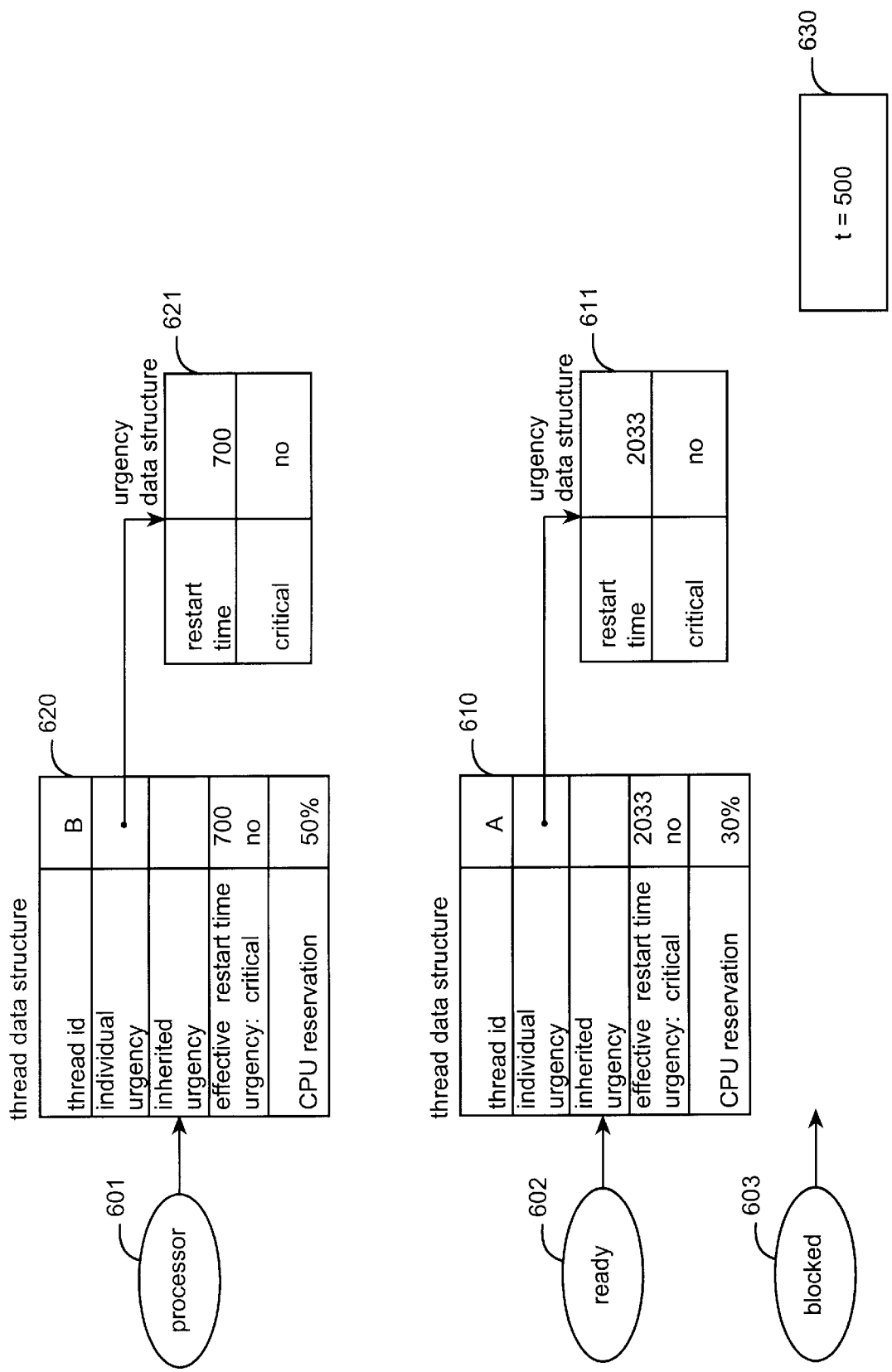
Figure 6I:
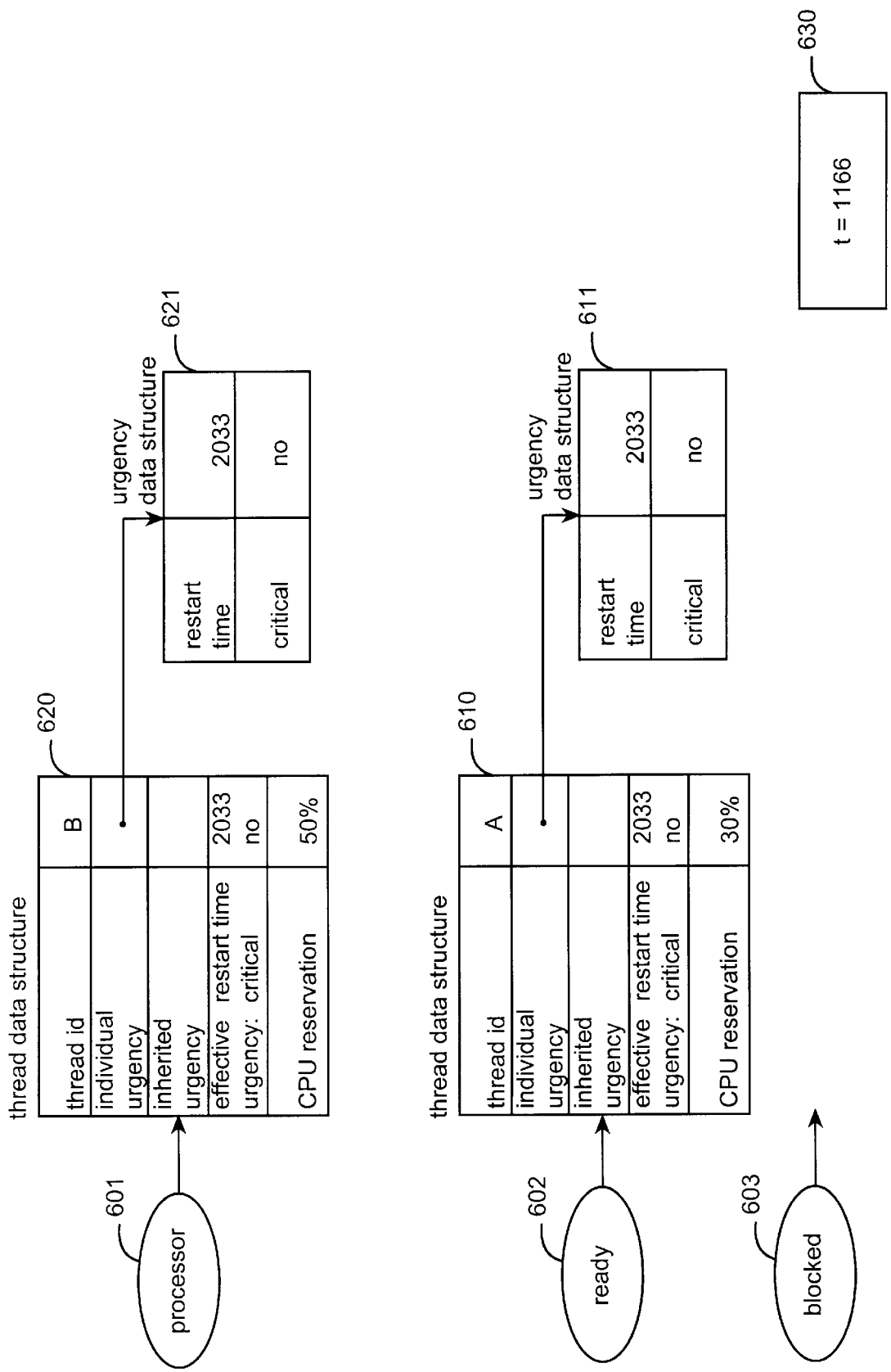

FIG. 6H is a data structure diagram showing the scheduling status data structure after the scheduler has moved thread B from the ready list to the processor list and thread A from the processor list to the ready list. FIG. 6I is a data structure diagram showing the scheduling status data structure after the scheduler has executed thread B for 666 μs to increase the restart time of thread B by 1333 μs (666 μs/50%), from 700 μs at t=500 μs to 2033 μs at t=1166 μs.

Figure 6J:
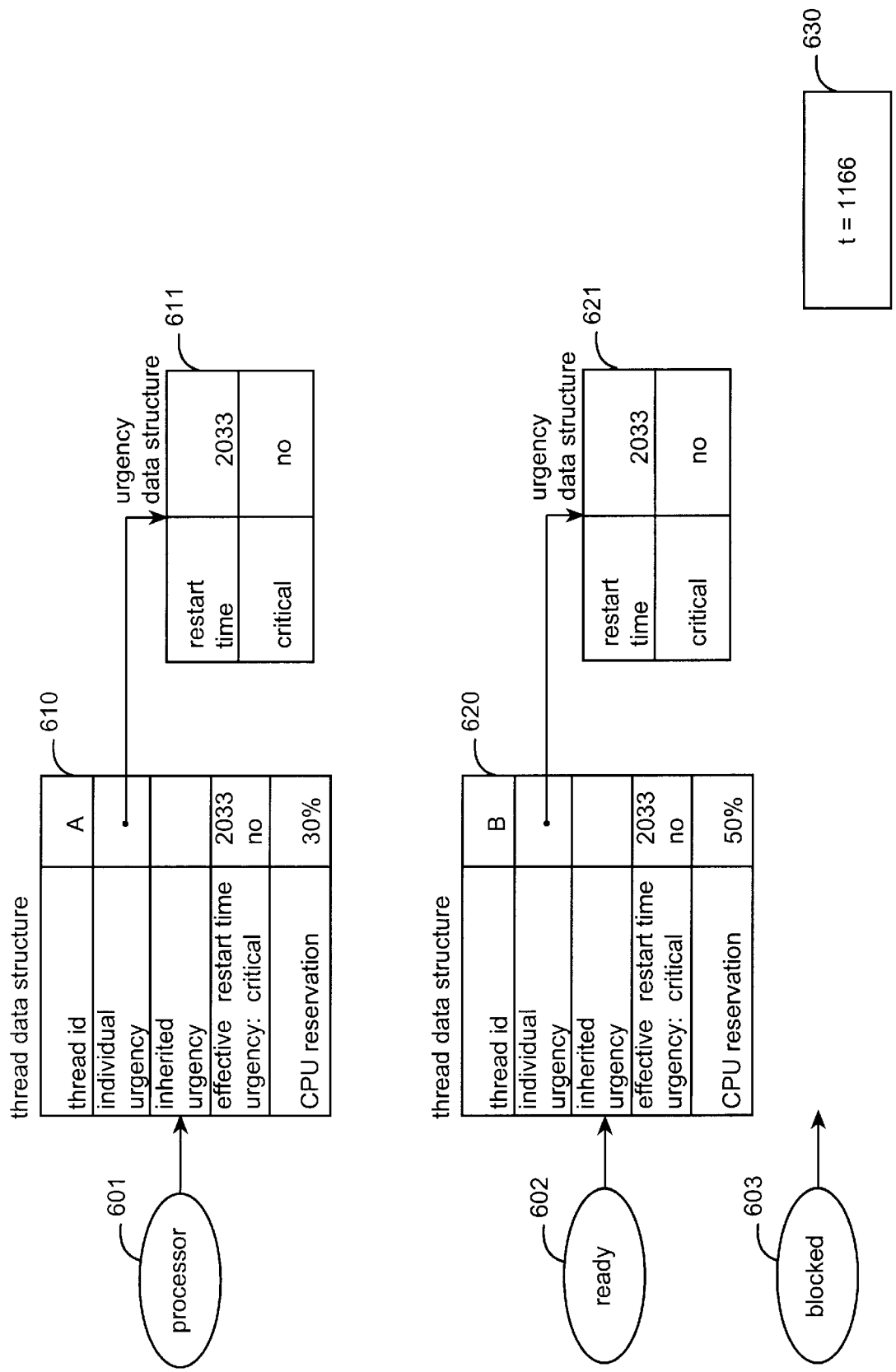
Figure 6K:
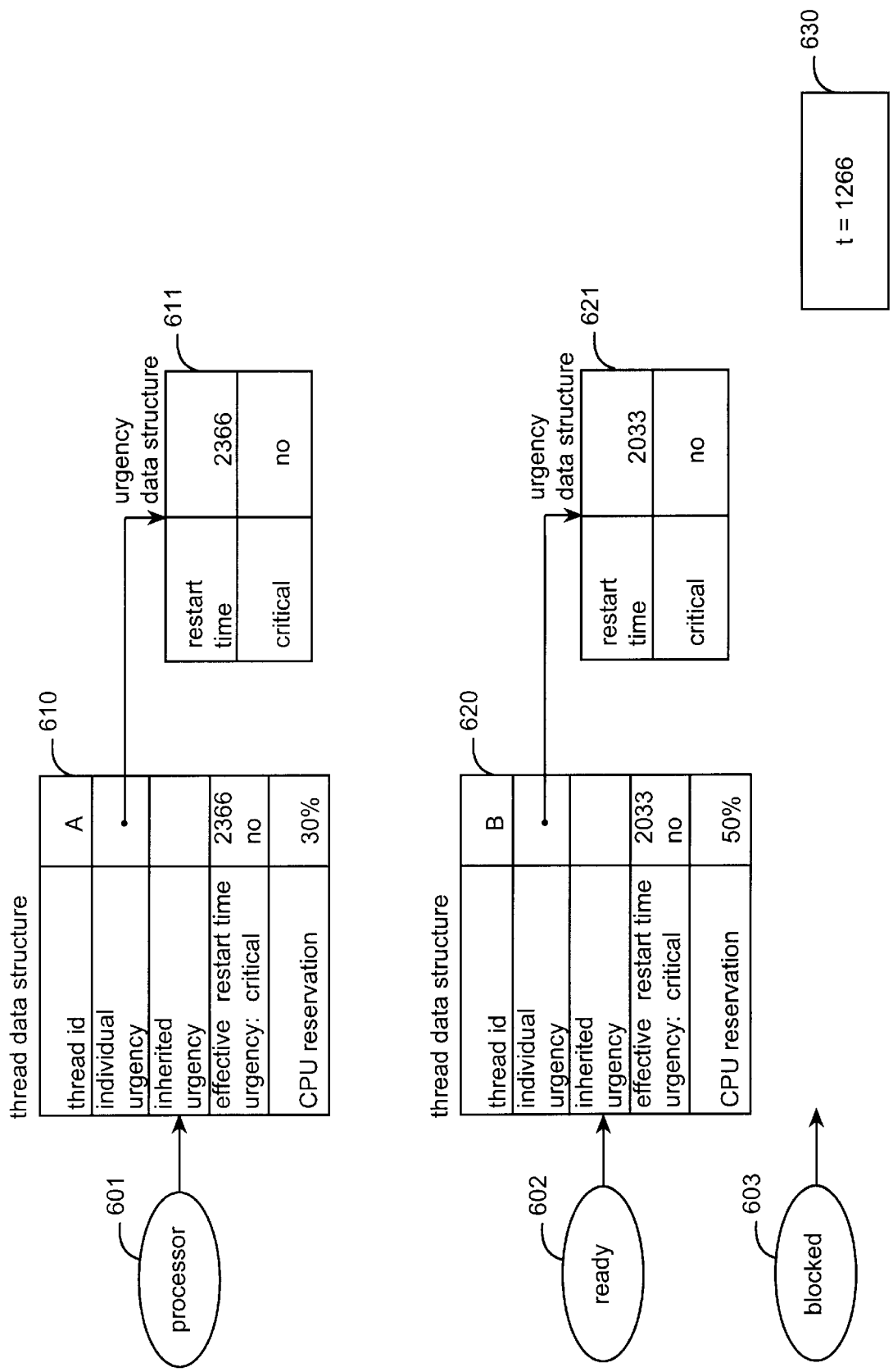

FIG. 6J is a data structure diagram showing the scheduling status data structure after the scheduler has moved thread A from the ready list to the processor list and thread B from the processor list to the ready list. FIG. 6K is a data structure diagram showing the scheduling status data structure after the scheduler has executed thread A for the minimum execution period, 100 μs. FIG. 6K shows that the scheduler has incremented thread A's restart time by 333 μs (100 μs/30%), from 2036 μs at t=1166 μs to 2336 μs at t=1266 μs.

Figure 6L:
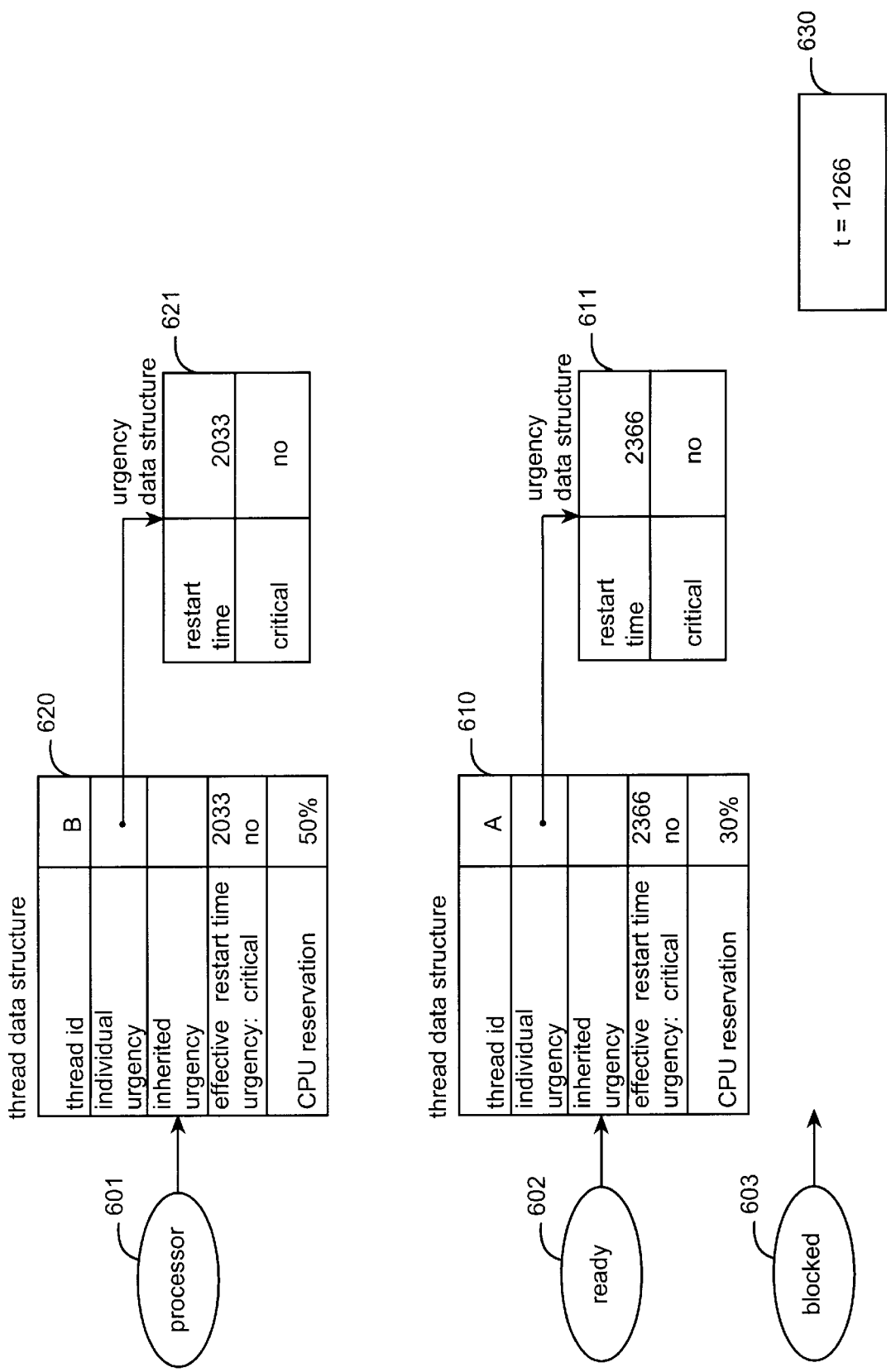
Figure 6M:
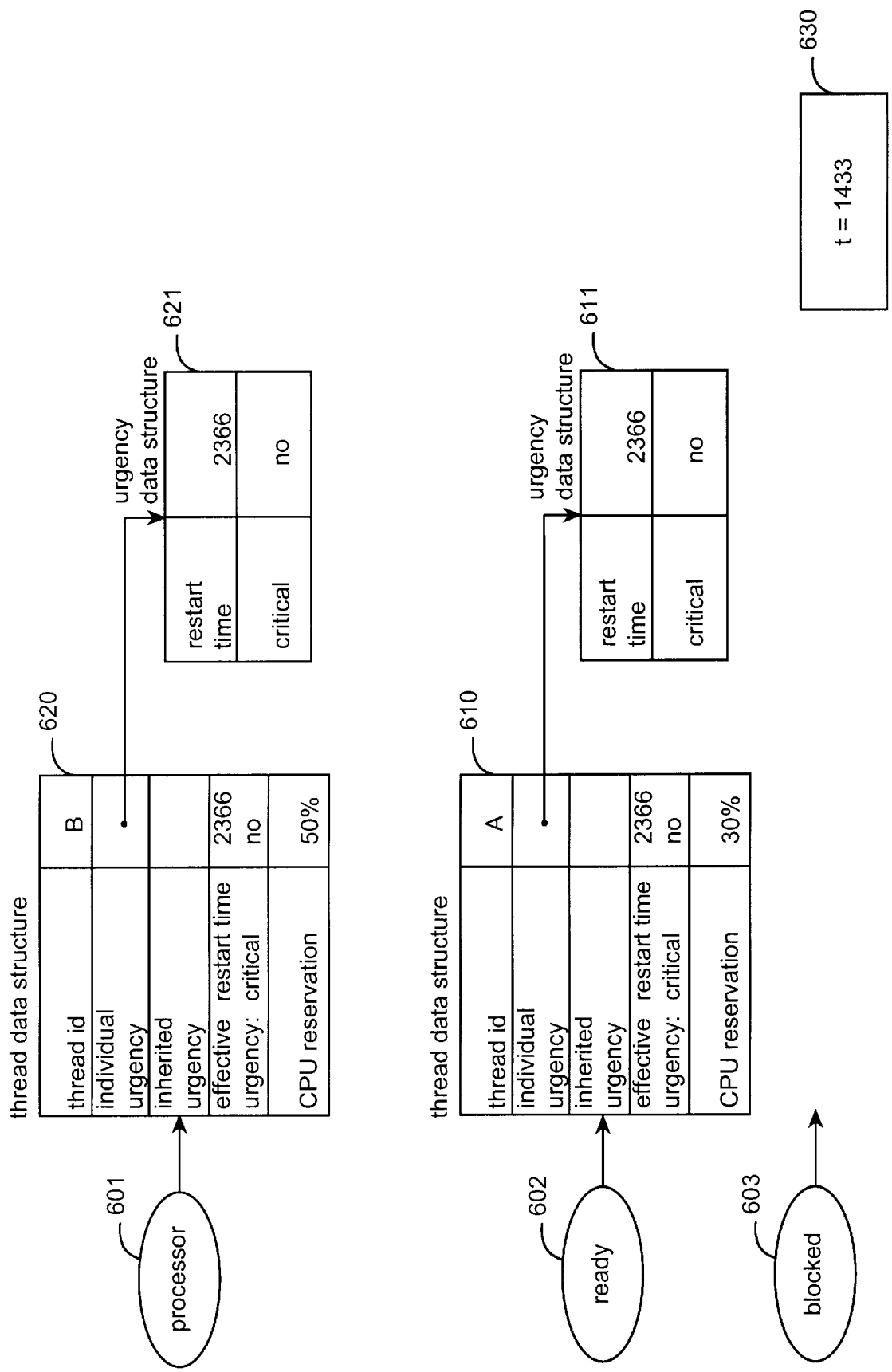

FIG. 6L is a data structure diagram showing the scheduling status data structure after the scheduler has moved thread B from the ready list to the processor list and thread A from the processor list to the ready list. FIG. 6M is a data structure diagram showing the scheduling status data structure after the scheduler has executed thread B for 167 μs to increase the restart time of thread B by 333 μs (167 μs/50%), from 2033 μs at t=1266 μs to 2366 μs at t=1433 μs.

When reviewing the performance of the facility during the scheduling example shown in FIGS. 6A–6M, FIG. 8 shows that, though thread B has a higher CPU reservation (50%) than thread A (30%), thread A received more processor time (400 μs) than thread B (100 μs) during the period during which thread A was subject to a time-specific scheduling constraint (t=0 to 500 μs). When thread A's time-specific scheduling constraint ended at t=500 μs, thread B quickly received exclusive use of the processor until its total processor time bore approximately the same relationship to thread A's total processor time (766 μs:400 μs) borne by thread A's CPU reservation to thread B's CPU reservation (50%: 30%) at t=1166 μs. After this point, threads A and B continued to receive processor time at a rate approximately proportional to their respective CPU reservations. As such, the scheduler succeeded at both of the competing goals of (1) allocating the processor time necessary to a thread to meet a time-specific scheduling constraint, and (2) balancing overall processor time to threads in proportion to their CPU reservations.

Figure 9A:
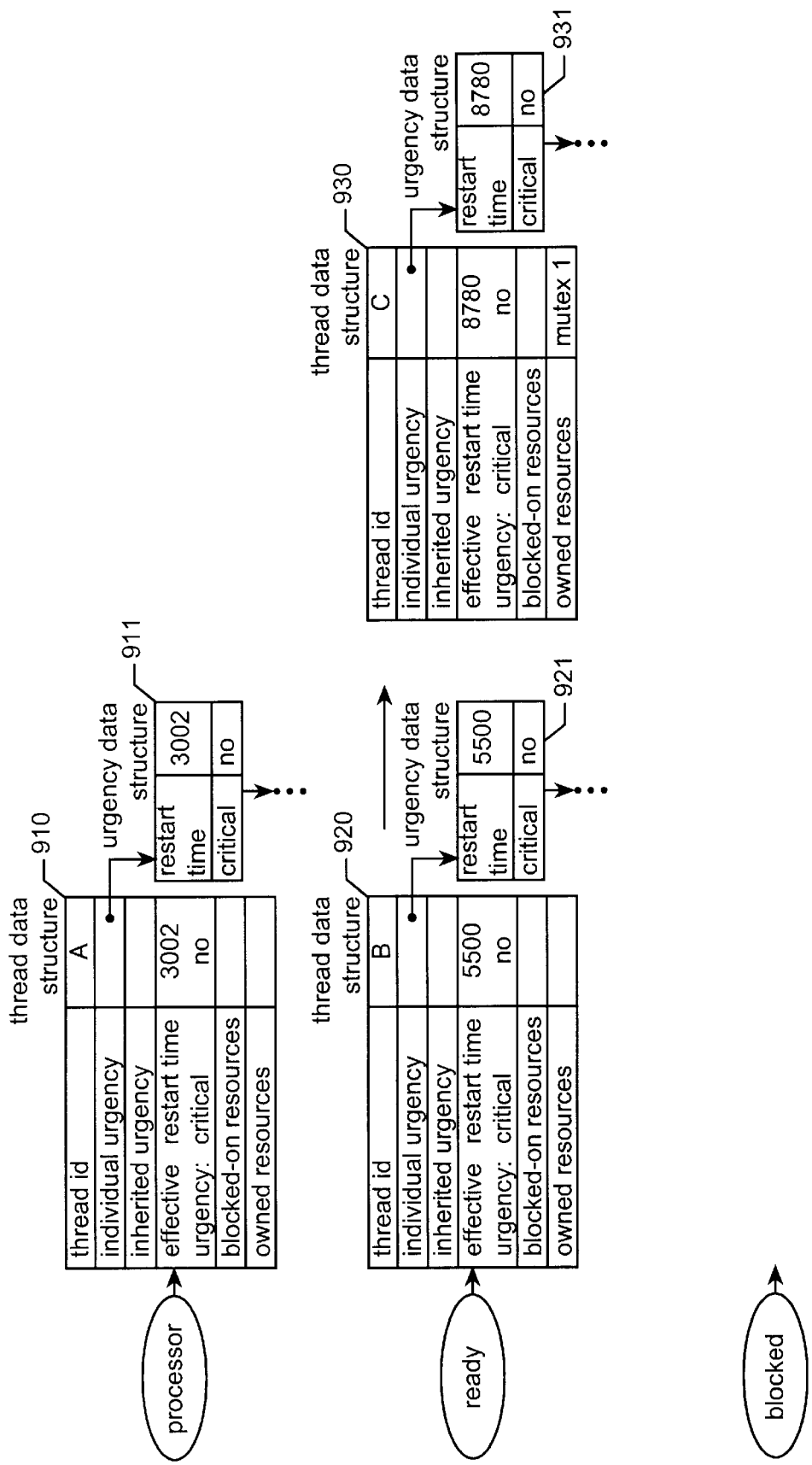
FIGS. 9A–9F are data structure diagrams showing the contents of the scheduling status data structure that illustrate the inheritance of urgency from a thread that blocks on a resource to the thread that owns the resource.
Figure 9B:
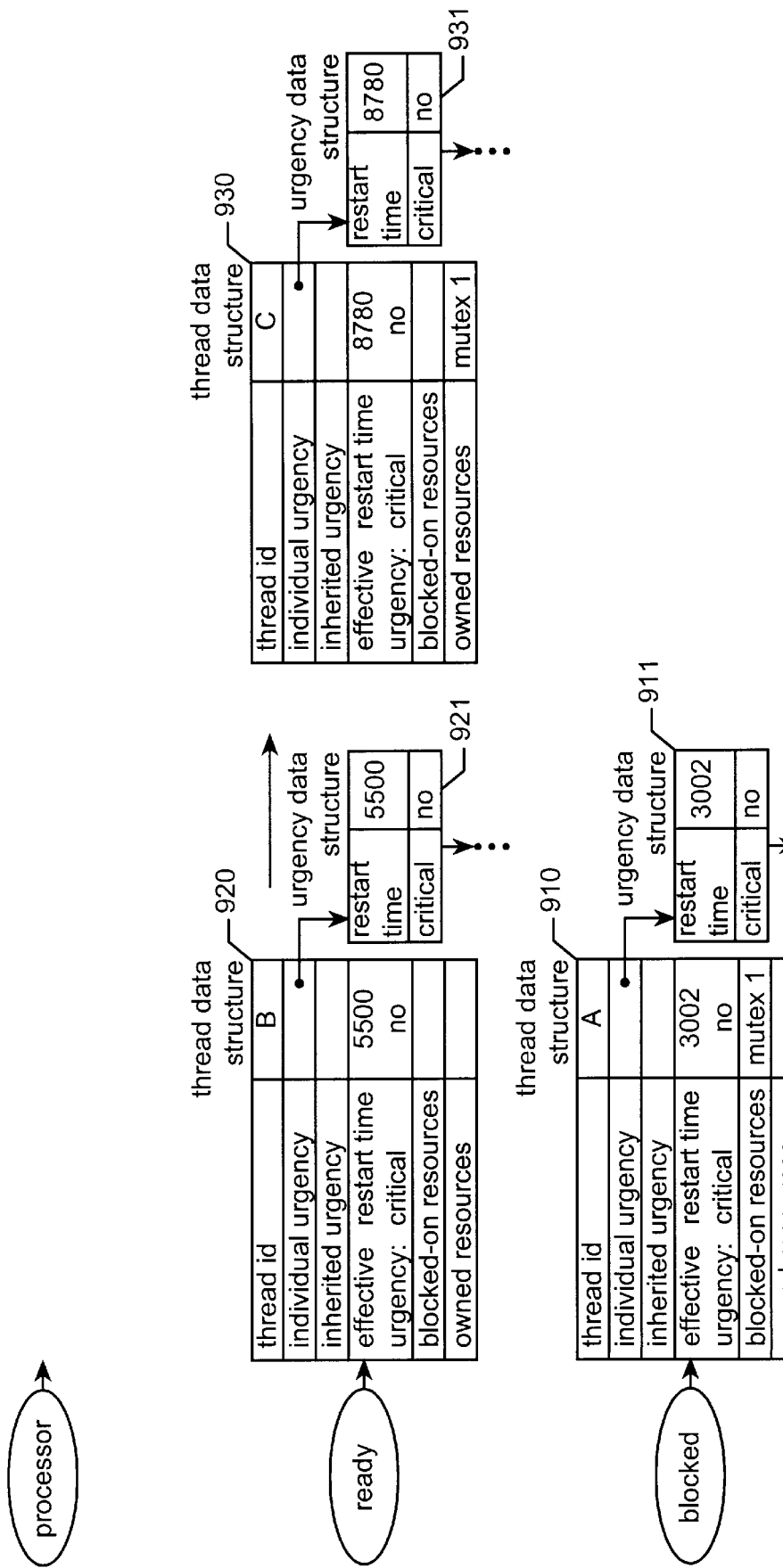
Figure 9C:
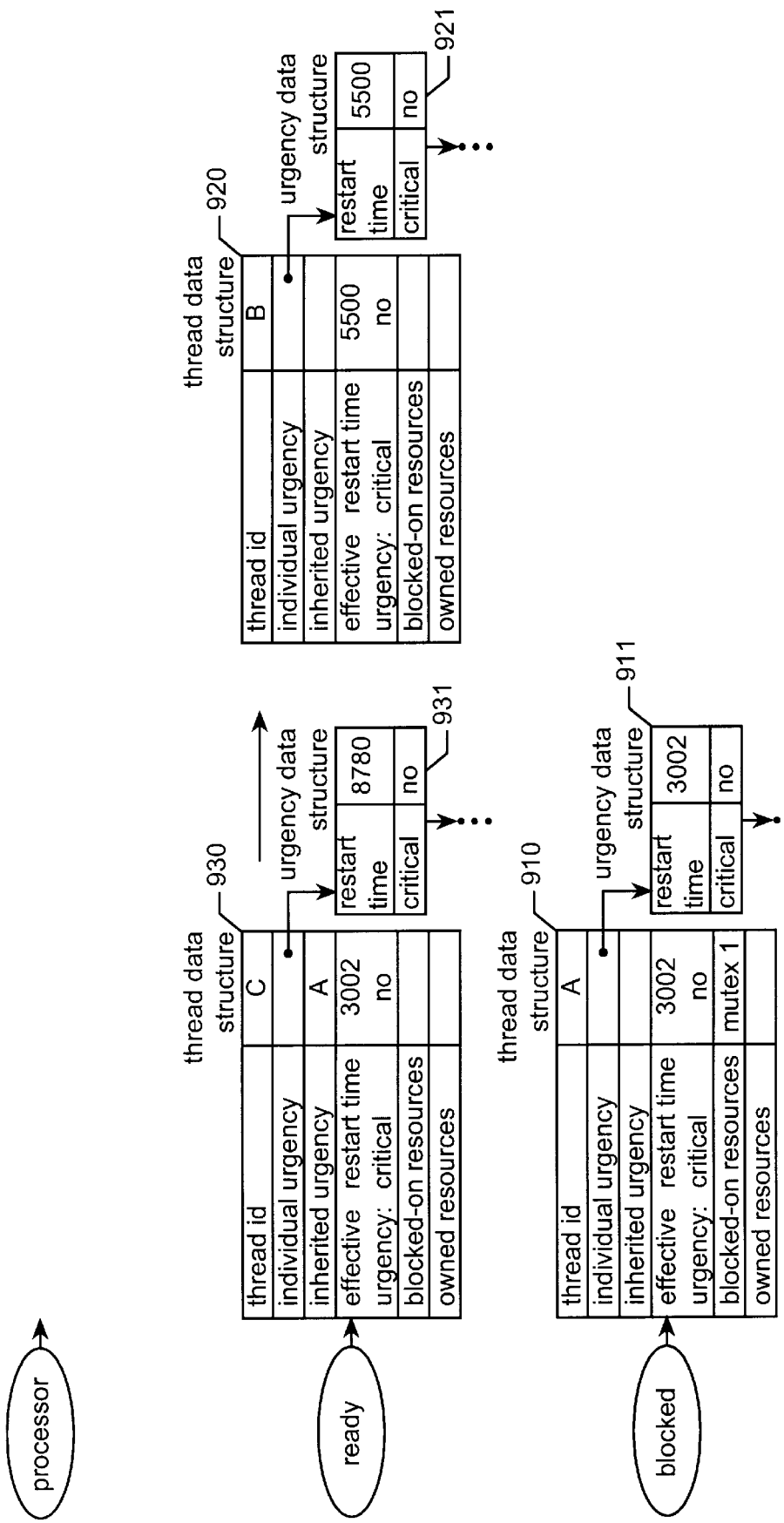
Figure 9D:
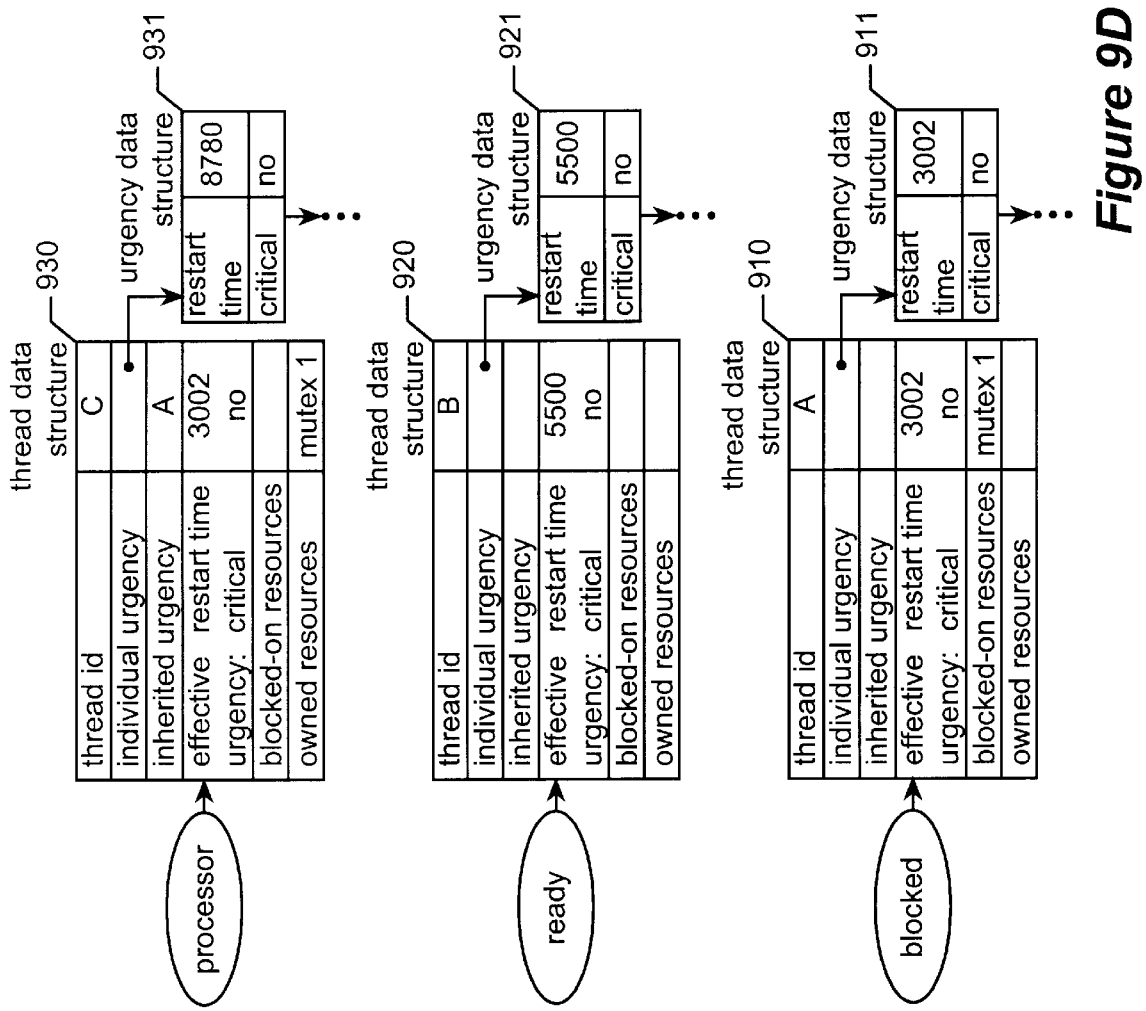
Figure 9E:
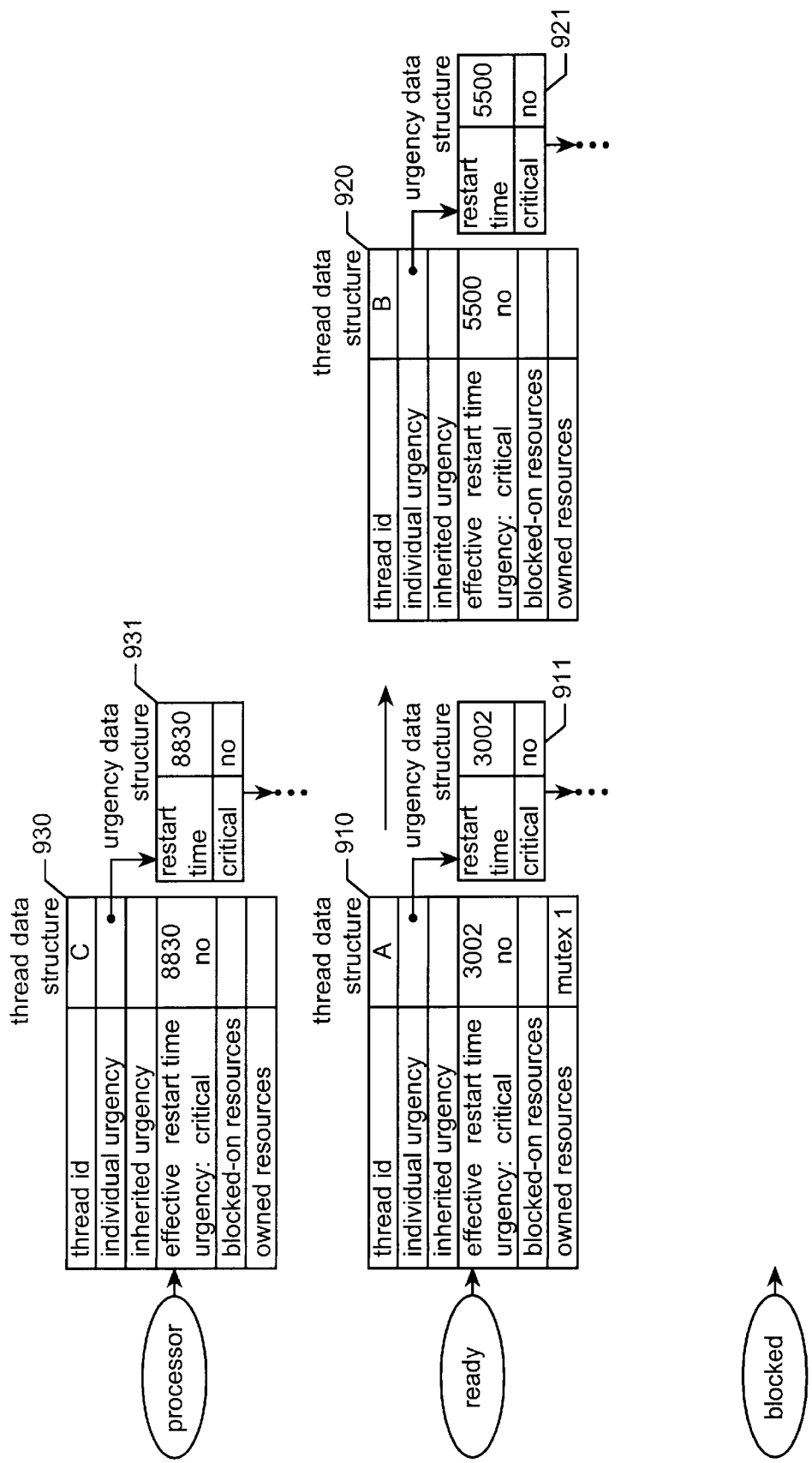
Figure 9F:
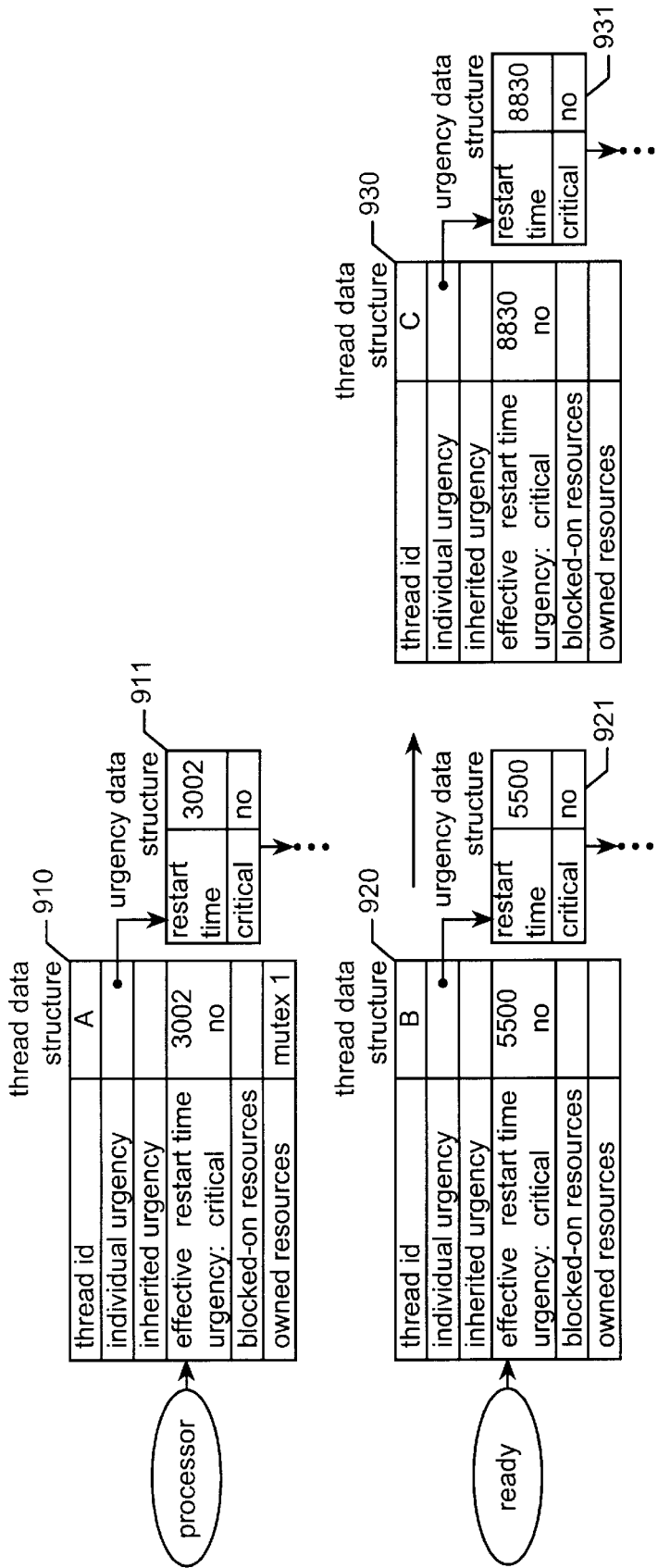
Figure 10:
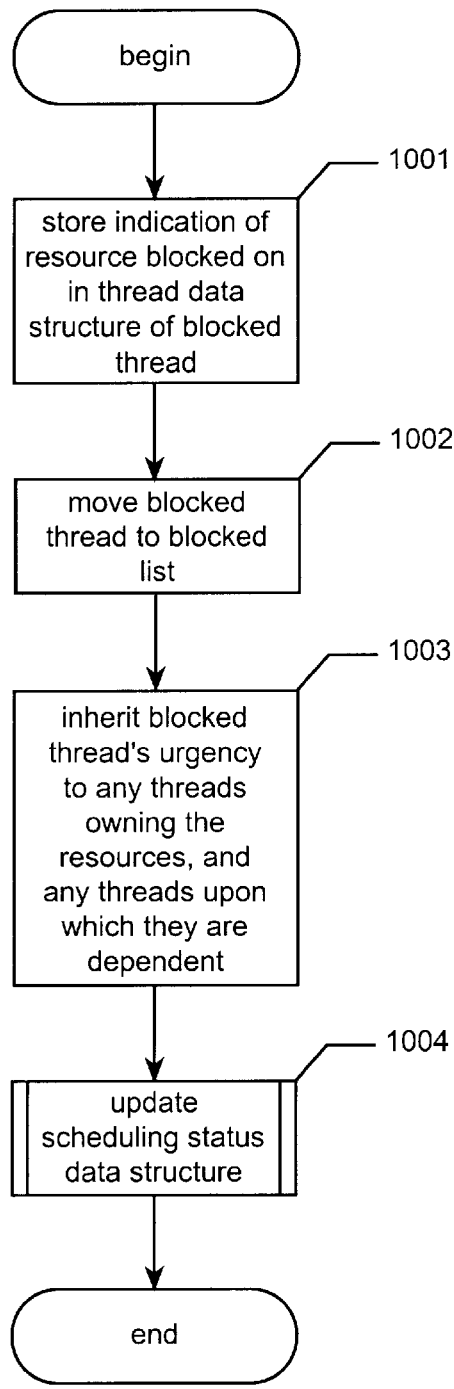
FIG. 10 is a flow diagram showing the steps preferably performed by the scheduler when an executing thread blocks on a resource.
Figure 11:
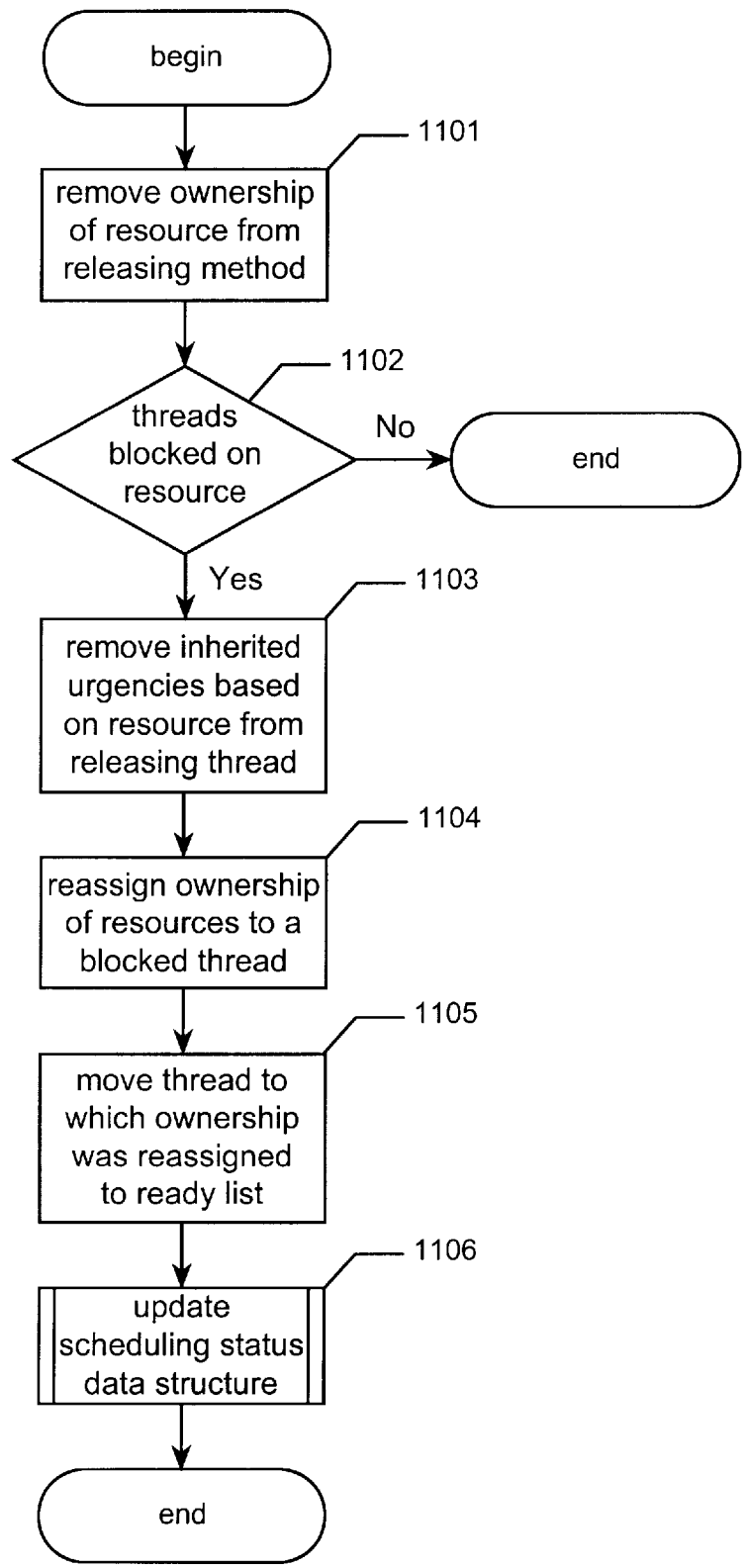
FIG. 11 is a flow diagram showing the steps preferably performed by the scheduler when an executing thread releases ownership of a resource.

FIGS. 9–11 illustrate inheriting the urgency from an urgent thread that has blocked on a resource. When a blocking thread blocks on a resource owned by an owning thread, the owning thread inherits the urgency of the blocked thread, and the processor time consumed by the owning thread while it owns the resource is charged against the owning thread. FIGS. 9A–9F are data structure diagrams showing the contents of the scheduling status data structure that illustrate the inheritance of urgency from a thread that blocks on a resource to the thread that owns the resource. While all of the threads shown in FIGS. 9A–9F are subject to time-specific scheduling constraints to facilitate this example, the approach employed by the scheduler is effective for any combination of threads subject to and not subject to time-specific scheduling constraints.

FIG. 9A is a data structure diagram showing the initial state of the scheduling status data structure. FIG. 9A shows the processor, ready, and blocked lists. In FIG. 9A, no threads are blocked, thread A has the earliest restart time and is therefore on the processor list, and thread C owns a mutual exclusion synchronization mechanism called "mutex 1" which only supports ownership by one thread at a time. Further, no thread has any inherited urgencies.

FIG. 9B is a data structure diagram showing the state of the scheduling status data structure after thread A has attempted to acquire mutex 1 and has blocked on it pending thread C's ownership of mutex 1. FIG. 9B shows that thread A has been moved to the blocked list.

FIG. 9C is a data structure diagram showing the state of the scheduling status data structure after the scheduler has inherited the urgency of a thread blocked on a resource to the thread that owns the resource. FIG. 9C shows that the scheduler has inherited thread A's urgency (restart time= 3002 μs, not critical) to thread C.

FIG. 9D is a data structure diagram showing the state of the scheduling status data structure after the scheduler has moved the thread with inherited urgency to the processor list to execute. FIG. 9D shows that the scheduler has moved thread C, which has the earliest effective restart time after inheriting thread A's urgency, to the processor list.

FIG. 9E is a data structure diagram showing the state of the scheduling status data structure after the thread with inherited urgency has released the resource. FIG. 9E shows that thread A has released mutex 1. In response, the scheduler has revoked thread C's inheritance of thread A's urgency. FIG. 9E further shows that the scheduler has increased the restart time in thread C's top urgency data structure 931 to account for work done by thread C while it was inheriting the urgency of thread A.

FIG. 9F is a data structure diagram showing the state of the scheduling status data structure after the scheduler has removed the thread whose inherited urgency was revoked by the scheduler. FIG. 9F shows that the scheduler has replaced thread C, whose restart time is once again the latest, on the processor list with thread C, whose restart time is the earliest.

FIG. 10 is a flow diagram showing the steps preferably performed by the scheduler when an executing thread blocks on a resource. In step 1001, the scheduler stores an indication of the resource blocked on in the thread data structure of the blocked thread. In step 1002, the scheduler moves the blocked thread from the processor list to the blocked list. In step 1003, the scheduler inherits the top urgency data structure on the individual urgency stack of the blocked thread to any threads owning the resource blocked on, as well as any threads upon which the owning threads are dependent, either directly or indirectly. Step 1003 involves adding to the inherited urgency component of the thread data structures for the owning threads and any threads upon which the owning threads are dependent. A reference to the cached effective urgency of the blocked thread step 1003 further involves reevaluating the cached effective urgency for each such thread in light of this new inherited urgency. In step 1004, the scheduler performs the steps shown in FIG. 7 to update the scheduling status data structure. After step 1004, there are no more steps that the scheduler must perform for an executing thread blocked on a resource.

FIG. 11 is a flow diagram showing the steps preferably performed by the scheduler when an executing thread releases ownership of a resource. In step 1101, the scheduler removes ownership of the resource from the releasing thread by removing the indication stored in its thread data structure that it owns the resource. In step 1102, if one or more other threads are blocked on the resource, then the scheduler continues at step 1103, else the steps shown in FIG. 11 conclude. In step 1103, the scheduler removes from the releasing thread the urgencies that the thread has inherited based on its ownership of the resource. Step 1103 involves removing references to the effective urgency of this thread from the inherited urgency component of the thread data structures for any threads that have inherited the urgency of this thread as a result of this thread being blocked on the resource. Step 1103 further involves reevaluating the cached effective urgency of such threads in light of the removed inherited urgency. In step 1104, the scheduler reassigns ownership of the resource to one of the threads that is blocked on it. The scheduler preferably employs conventional techniques for reassigning synchronization mechanisms in step 1104, but may also consider the relative urgencies of the blocked threads, as well as whether any of the blocked threads are also blocked on other resources. In step 1105, the scheduler moves the thread to which ownership was reassigned from the blocked list to the ready list. In step 1106, the scheduler performs the steps shown in FIG. 7 to update the scheduling status data structure. The steps shown in FIG. 11 then conclude.

Figure 12:
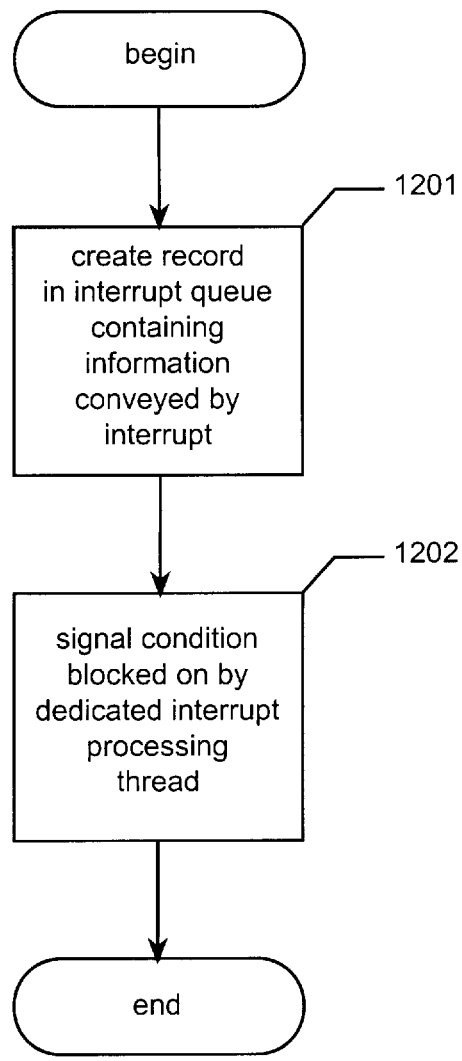
FIG. 12 is a flow diagram showing the steps preferably performed by an interrupt service routine adapted for use with the scheduler.
Figure 13:
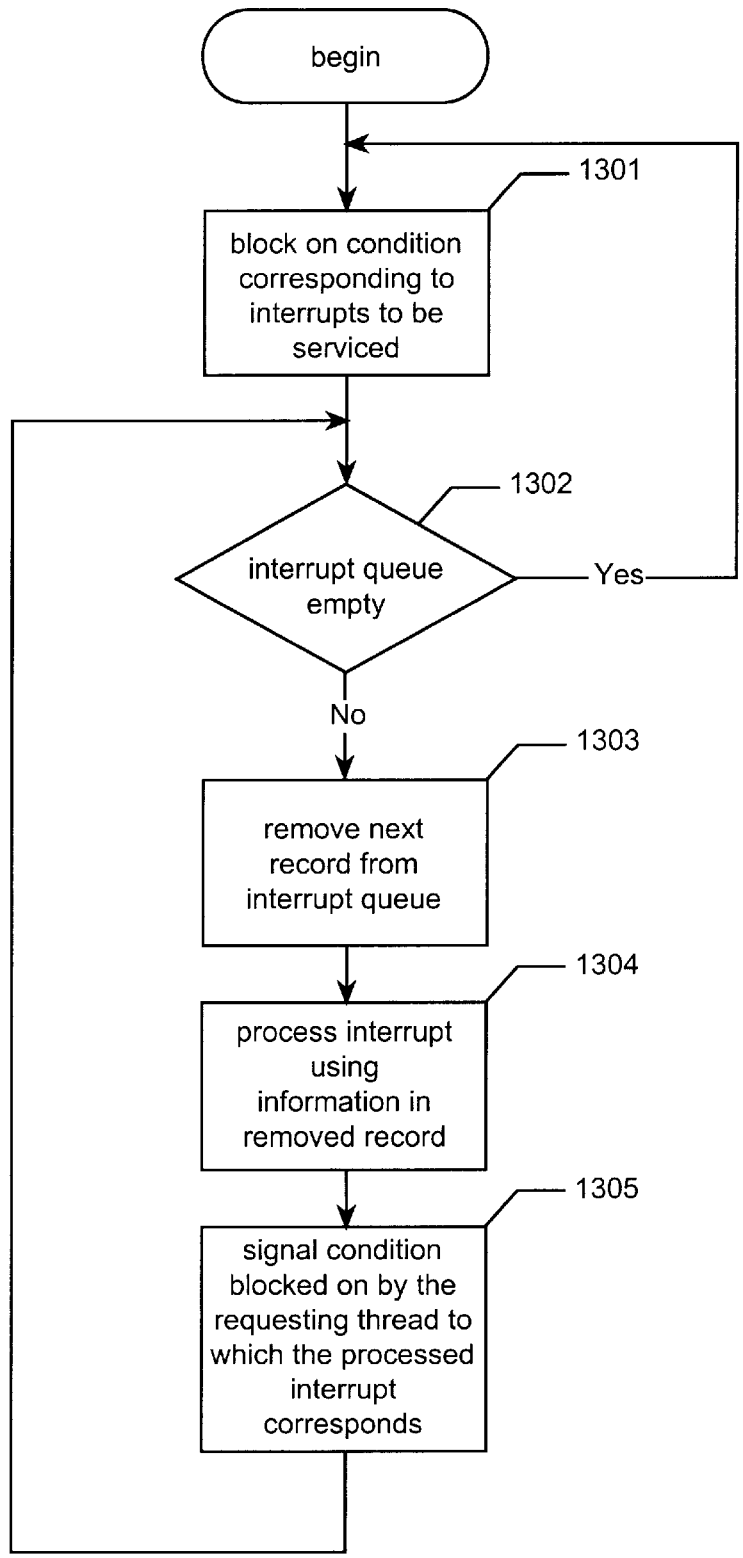
FIG. 13 is a flow diagram showing the steps preferably performed by a dedicated interrupt service thread.

FIGS. 12–13 illustrate scheduled interrupt handling. FIG. 12 is a flow diagram showing the steps preferably performed by an interrupt service routine adapted for use with the scheduler. These steps are preferably performed synchronously in response to the occurrence of a specific interrupt. The interrupt generally occurs subsequent to a request for input/output services made by a requesting thread. The requesting thread generally blocks on a condition after making the input/output request that is signaled when the input/output request is completed. In step 1201, the interrupt service routine creates a new record in a queue that contains one record for each occurrence of the interrupt not yet processed. The created record contains information conveyed by the interrupt needed to process the interrupt. The created record preferably also contains an indication of the condition blocked on by the requesting thread, which the dedicated interrupt processing thread can signal to return the requesting thread from the blocked list to the ready list when the dedicated interrupt processing thread finishes processing the interrupt. In step 1202, the scheduler signals a condition blocked on by a dedicated interrupt processing thread, discussed below in conjunction with FIG. 13. This allows the blocked dedicated interrupt processing thread to move from the blocked list to the ready list to process the occurrence of the interrupt in response to which the interrupt service routine was executed, as well as any other occurrences of the interrupt represented by other records in the queue. As is discussed in more detail below, some interrupts require little or no substantive processing, and do not require a dedicated interrupt processing thread.

FIG. 13 is a flow diagram showing the steps preferably performed by a dedicated interrupt service thread. These steps are preferably performed continuously. In step 1301, the dedicated interrupt service thread blocks on a condition signaled by the interrupt service routine for the interrupts to be processed. In step 1302, when this condition is signaled by the interrupt processing routine in step 1302, if the interrupt queue is empty, then the dedicated interrupt service thread continues at step 1301 to again block on the condition, else the dedicated interrupt service thread continues at step 1303. In step 1303, the dedicated interrupt service thread removes a record from the interrupt queue. In step 1304, the dedicated interrupt service thread processes the interrupt corresponding to removed record using the contents of the remove records. In step 1305, the dedicated interrupt service thread signals the condition blocked on by the requesting thread to which the interrupt processed in step 1304 corresponds. Signaling the condition enables the requesting thread to move from blocked list the to the ready list and become eligible to resume execution. After step 1305, the dedicated interrupt service thread continues at step 1302.

As is noted above in conjunction with FIG. 12, a dedicated interrupt service routine such as the one shown in FIG. 13 is only necessary for interrupts whose handling requires a significant amount of processing. For interrupts whose handling does not require a significant amount of processing, no dedicated interrupt service routine is necessary, and the thread waiting for interrupt handling to complete can block on the condition signaled by the interrupt service routine instead of a condition signaled by a dedicated interrupt service thread.

Figure 14:
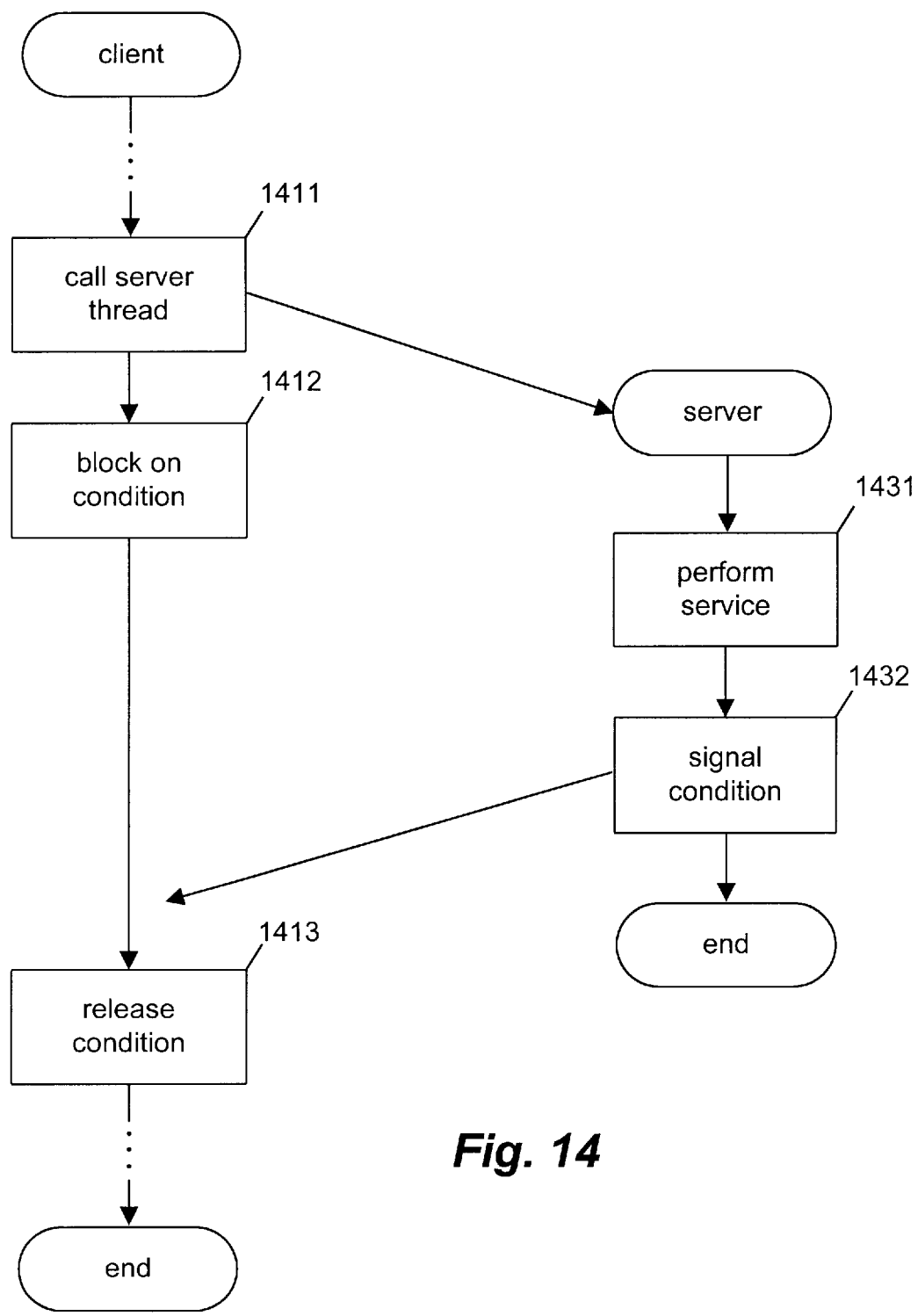
FIG. 14 is a flow diagram showing the steps preferably performed by the scheduler in the server and client threads.
Figure 15:
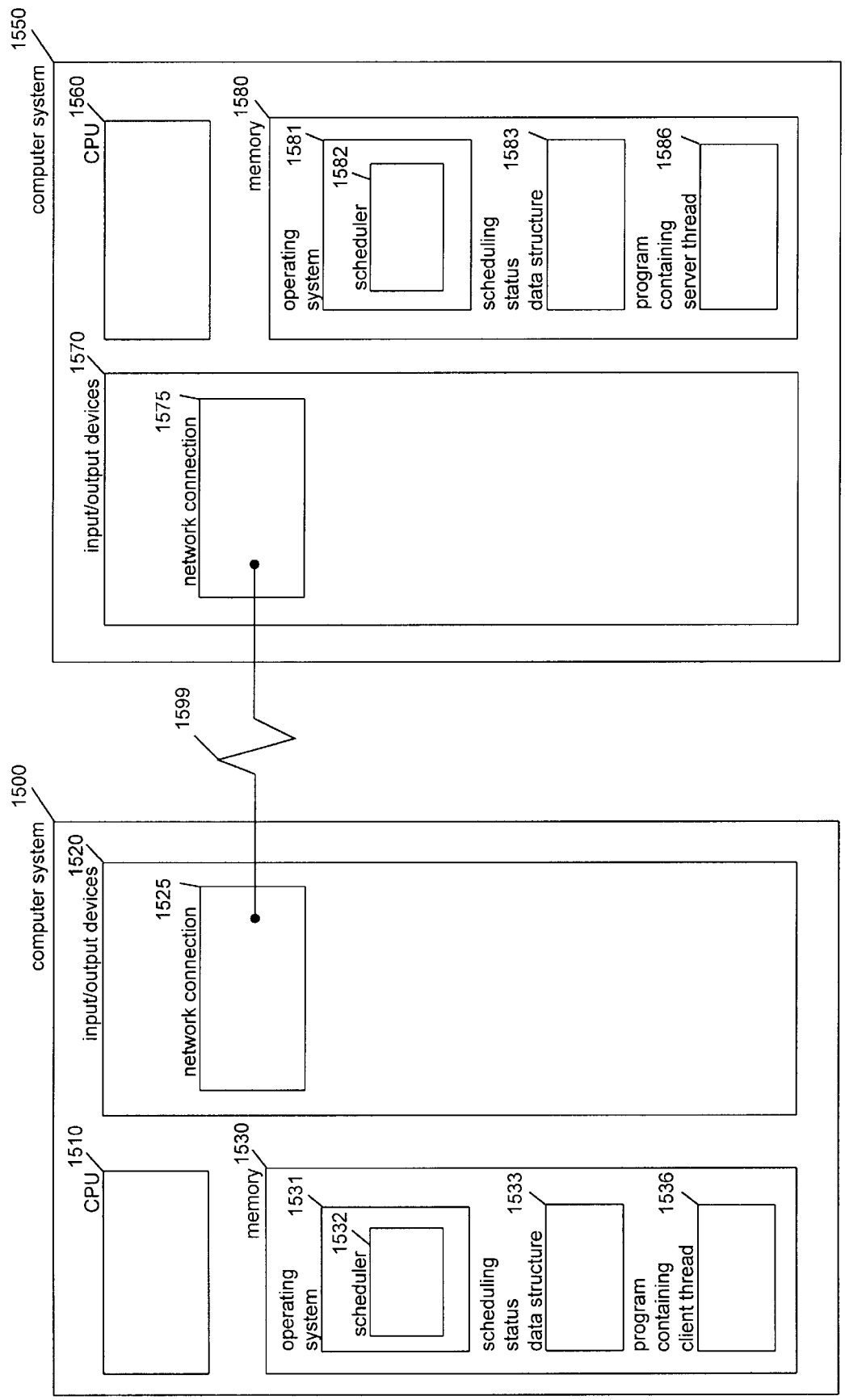
FIG. 15 is a high-level block diagram showing a computer network in which the scheduler preferably performs scheduling across two individual computer systems.
Figure 16:
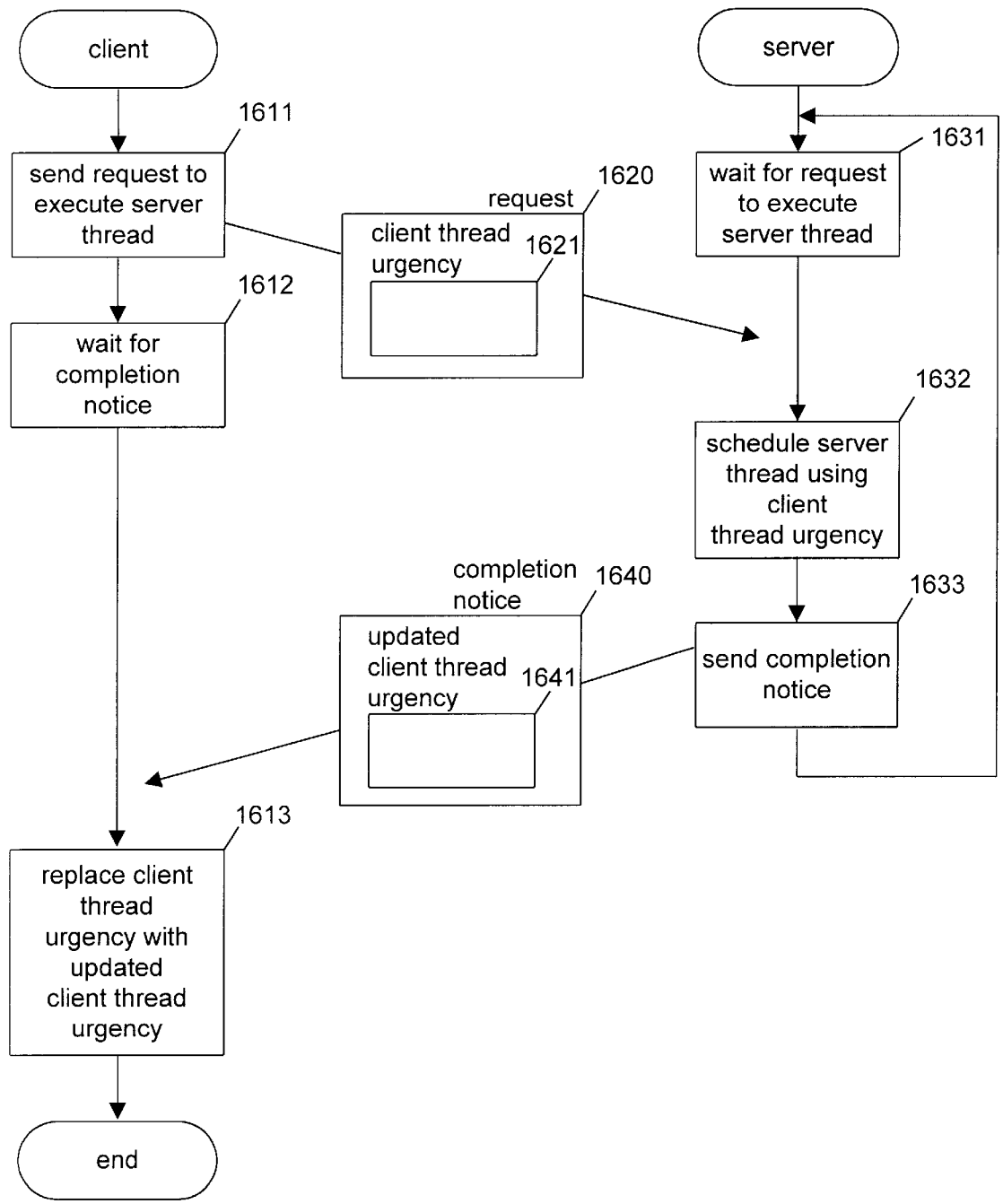
FIG. 16 is a flow diagram showing the steps preferably performed by the scheduler in the server and client threads on separate computer systems.

FIGS. 14–16 illustrate inheriting urgency from a client thread to a server thread executing on its behalf. When a server thread performs a service on behalf of a client thread, the server thread inherits the urgency of the client thread, and the processor time consumed by the server thread in performing the service is charged against the client thread. FIG. 14 is a flow diagram showing the steps preferably performed by the server and client threads. The diagram shows steps 1411–1413 performed by the client thread and steps 1431–1432 performed by the server thread. After performing zero or more preceding steps (not shown), the client thread continues at step 1411. In step 1411, the client thread calls the server thread, which is preferably created in response to the call. In step 1412, the client thread blocks on a condition that will be signaled by the server thread when the call of step 1411 is completed. In step 1431, the server thread performs the service requested by calling the server thread. In step 1432, the server thread signals the condition blocked on by the client thread in step 1412. The server thread then concludes. In step 1413, the client thread releases the condition in blocked on, if necessary. The client thread then performs zero or more succeeding steps (not shown).

The scheduler also preferably enables a server thread on a server computer system to inherit the urgency of a client thread on a separate client computer system. FIG. 15 is a high-level block diagram showing a computer network in which the scheduler preferably performs scheduling across two individual computer systems. The computer network 1599 connects two computer systems 1500 and 1550, both substantially similar to computer system 100 shown in FIG. 1, via network connections 1525 and 1575. The memory 1530 of computer system 1500 preferably contains an operating system 1531, which itself contains a copy of the scheduler 1532, as well as a thread status data structure 1533. Similarly, the memory 1580 of computer system 1550 preferably contains an operating system 1581, which itself contains a copy of the scheduler 1582, as well as a thread status data structure 1583. The memory 1530 of computer system 1500 preferably further contains a program 1536 containing the client thread, while the memory 1580 of computer system 1550 preferably further contains a program 1586 containing the server thread. Given this arrangement of the program 1536 containing the client thread and the program 1586 containing the server thread, computer system 1500 is called the client computer system and computer system 1550 the server computer system. Each computer system, however, is preferably capable of serving as either the client computer system or the server computer system.

FIG. 16 is a flow diagram showing the steps preferably performed by the scheduler in the server and client threads on separate computer systems. In step 1631, the server thread, executing in the server computer system, waits for a request to execute. In step 1611, the client thread, executing in the client computer system, sends a request to execute the server thread 1620 to the server computer system. The request 1620 contains the top urgency data structure of the client thread 1621, provided by the scheduler of the client computer system. In step 1632, when the request is received in the server computer system, the server thread pushes the received client thread urgency data structure onto its own individual urgency stack, so as inherit the urgency of the client thread. If the urgency of the client thread subsequently changes, the scheduler for the client computer system preferably sends an additional message to the scheduler for the server computer system containing the updated urgency. In response, the scheduler for the server computer system inherits the updated urgency to the server thread (not shown). When the server thread completes the request, in step 1633, it pops the client thread's urgency data structure, updated to reflect the work done by the server thread on the client thread's behalf, off of its individual urgency stack and sends it in a completion notice 1640 to the client computer system. After step 1633, the server thread continues at step 1631 to wait for the next request to execute the server thread. The completion notice 1640 sent in step 1633 contains the top urgency data structure of the client thread 1641 updated to reflect the work done by the server thread on the client's behalf. In step 1613, when the completion notice is received in the client computer system, the client thread replaces its top urgency data structure with updated urgency data structure 1641, thereby charging itself for the work done on its behalf by the server thread. The steps shown in FIG. 16 then conclude.

While this invention has been shown and described with reference to preferred embodiments, it will be understood by those skilled in the art that various changes or modifications in form and detail may be made without departing from the scope of the invention. For example, the scheduler may be readily adapted to schedule the use of other resources, such as hardware devices. The scheduler could also use various other indications of urgency besides the combination of restart times and criticality.

We claim:

1. A method in a computer system for scheduling the use of a limited resource of the computer system by a plurality of consumer entities, the method comprising the steps of:
    (a) receiving for each consumer entity either a time-general scheduling constraint, indicating that the consumer entity should be able to use the resource for a specified share of a total time that the resource is available, or a time-specific scheduling constraint, indicating that the consumer entity should be permitted to use the resource for a specified total period of time by a specified time deadline;
    (b) for each consumer entity for which is received a time-general scheduling constraint, determining a restart time corresponding to the time-general scheduling constraint based on the share specified by the time-general scheduling constraint;
    (c) for each consumer entity for which is received a time-specific scheduling constraint, determining a restart time corresponding to the time-specific scheduling constraint based on the total period of time and the deadline specified by the time-specific scheduling constraint; and
    (d) selecting the consumer entity having the earliest restart time to use the resource.

2. The method of claim 1 wherein each of the plurality of consumer entities is a thread.

3. The method of claim 2 wherein the resource is a processor in the computer system, and wherein step (d) includes the step of selecting the thread having the earliest restart time for execution on the processor.

4. The method of claim 1, wherein each time-general scheduling constraint contains a resource share value, and wherein step (b) includes the step of:
    for each consumer entity for which is received a time-general scheduling constraint, determining a restart time that succeeds a time at which step (b) is performed by a period inversely related to the resource share value.

5. The method of claim 1, further including the steps of:
    (e) receiving a time-specific scheduling constraint for a consumer entity for which was initially received a time-general scheduling constraint;
    (f) a determining a restart time corresponding to the specific scheduling constraint received in step (e); and
    (g) for the consumer entity for which the time-specific scheduling constraint was received in step (e), replacing the restart time determined in step (b) with the restart time determined in step (f), such that the selecting step selects based on the restart time determined in step (f).

6. The method of claim 1, further including the step of updating the restart time of the selected consumer entity to reflect the work done by the resource on behalf of the selected consumer entity while the consumer entity was selected to use the resource.

7. The method of claim 1, further including the steps of:
    identifying a future time at which the restart time of the selected consumer entity will be later than the restart time of one of the other consumer entity; and
    setting a timer interrupt to occur at the identified future time.

8. The method of claim 7 wherein the identifying step is performed at an identifying time, and wherein the identified future time is later than the identifying time by at least a preselected minimum use period.

9. The method of claim 7, further including the steps of, upon the occurrence of the set timer interrupt:

updating the restart time of the selected consumer entity to reflect the work done by the resource on behalf of the selected consumer entity while the consumer entity was selected to use the resource; and repeating the selecting step to select another consumer entity to use the resource.

10. A method in a computer system for scheduling the execution of a plurality of threads, each thread having an indication of its urgency, the plurality of threads including a first thread running in client code that contains an inter-thread call to server code executed by a second thread, the indication of urgency of the first thread indicating that it is more urgent than the second thread, the computer system having a measure of the execution of the first thread that is updated when the first thread executes to reflect such execution, the method comprising the steps of:

under the control of the client code executed by the first thread, initiating an inter-thread call to the server code executed by the second thread;

in response to the initiating step, modifying the urgency indicator of the second thread to attribute the higher urgency of the first thread to the second thread;

executing the second thread for an amount of time during the inter-thread call and updating the measure of the execution of the first thread to reflect the amount of time for which the second thread executes during the inter-thread call.

11. The method of claim 10, further including the step of:

when the inter-thread call is completed, modifying the urgency indicator of the second thread to attribute to the second thread its original urgency.

12. A method in a computer system for scheduling the processing of a device interrupt when one or more threads unrelated to the processing of the device interrupt are ready to be executed, the method comprising the steps of:

associating with each of the threads unrelated to the processing of the device interrupt an indication of the thread's urgency;

detecting an occurrence of the device interrupt;

in response to the detecting step, assigning a device interrupt processing thread for processing the detected device interrupt occurrence to the detected device interrupt occurrence;

associating an indication of urgency with the device interrupt processing thread; and scheduling the device interrupt processing thread relative to the threads unrelated to the processing of the device interrupt based upon the indications of urgency of each thread.

13. The method of claim 12, further including the steps of:

at a time preceding the performance of the detecting step, creating the device interrupt processing thread; and upon creating the device interrupt processing thread, blocking the device interrupt processing thread to wait for the occurrence of the device interrupt, and wherein the assigning step includes the step of unblocking the device interrupt processing thread to process the detected device interrupt occurrence.

14. A method for scheduling the execution of a server thread on a first computer system in response to a request from a client thread in a second computer system, each computer system having a scheduler, the client thread having an urgency indicator, the method including the steps of:

sending a request to execute the server thread from the second computer system to the first computer system, the request containing the urgency indicator of the client thread obtained from the scheduler of the second computer system;

receiving the request in the first computer system;

in response to the step of receiving the request, scheduling the server thread to execute under the control of the scheduler of the first computer system utilizing the urgency indicator of the client thread contained in the received request;

updating the urgency indicator of the client thread to reflect the work done by the server thread;

when execution of the server thread concludes, sending a completion notice from the first computer to the second computer system containing the updated urgency indicator of the client thread;

receiving the completion notice in the second computer system; and in response to the step of receiving the completion notice, scheduling the client thread under the control of the scheduler of the second computer system using the updated urgency indicator contained in the received completion notice.

15. An apparatus for scheduling the use of a computer system resource by consumer entities, comprising:

a scheduling constraint receiver that receives for each consumer entity either a time-specific scheduling constraint or a time-general scheduling constraint;

an urgency memory containing an urgency data structure for each consumer entity reflecting, at any given time, the relative immediate urgency of scheduling use of the computer system resource by the consumer entity;

an urgency generation subsystem that creates an urgency data structure in the urgency memory for each consumer entity that reflects a relative immediate urgency corresponding to the time-specific scheduling constraint or time-general scheduling constraint received for the consumer entity by the scheduling constraint receiver; and a scheduling subsystem for, at any given time, scheduling the use of the computer system resource for the consumer entity whose urgency data structure reflects the highest relative immediate urgency.

16. The apparatus of claim 15, further including an urgency updating subsystem for updating the relative immediate urgency reflected by the urgency data structure for the consumer entity scheduled to use the computer system resource by the scheduling subsystem to account for the use made of the computer system resource by the consumer entity while the consumer entity is scheduled to use the computer system resource.

17. The apparatus of claim 15 wherein each consumer entity is a thread.

18. The apparatus of claim 15 wherein the scheduled computer system resource is a processor.

19. The method of claim 1 wherein the restart time determined for each thread for which is received a time-specific scheduling constraint reflects the latest time at which exclusive use of the resource by the consumer entity would enable the consumer entity to use the resource for the total period of time specified by the time-specific scheduling constraint by the deadline specified by the time-specific scheduling constraint, and wherein the restart time determined for each thread for which is received a time-general scheduling constraint reflects the time by which use of the resource by the thread should commence in order for the thread to use the resource for the share of the total time that the resource is available specified by the time-general scheduling constraint.

20. A computer-readable medium whose contents cause a computer system to schedule the use of a limited resource of the computer system by a plurality of consumer entities by performing the steps of:

(a) receiving for each consumer entity either a time-general scheduling constraint, indicating that the consumer entity should be able to use the resource for a specified share of a total time that the resource is available, or a time-specific scheduling constraint, indicating that the consumer entity should be permitted to use the resource for a specified total period of time by a specified time deadline;

(b) for each consumer entity for which is received a time-general scheduling constraint, determining a restart time corresponding to the time-general scheduling constraint;

(c) for each consumer entity for which is received a time-specific scheduling constraint, determining a restart time corresponding to the time-specific scheduling constraint; and (d) selecting the consumer entity having the earliest restart time to use the resource.

21. The computer-readable medium of claim 20 wherein the resource is a processor, wherein each of the plurality of consumer entities is a thread, and wherein step (d) includes the step of selecting the thread having the earliest restart time for execution on the processor.

22. A computer memory containing a thread scheduling data structure for scheduling the execution of a plurality of threads, each thread being the subject of a timing constraint specifying timing guidelines for the execution of the thread, at least one of the threads being the subject of a time-specific scheduling constraint, at least one of the threads being the subject of a time-general scheduling constraint, the data structure containing, for each thread, a restart time based upon the timing constraint of which the thread is the subject, such that the threads may be scheduled by selecting for execution the thread having the earliest restart time.

\* \* \* \* \*